US012783125B2

(12) United States Patent
Syu et al.

(10) Patent No.: US 12,783,125 B2
(45) Date of Patent: Nov. 3, 2026

(54) MEMORY MANAGEMENT METHOD, ARTIFICIAL INTELLIGENCE PROCESSING SYSTEM, AND COMPUTER PROGRAM PRODUCT FOR TRAINING-STAGE-BASED MEMORY ALLOCATION IN ARTIFICIAL INTELLIGENCE MODEL TRAINING

(71) Applicant: PHISON ELECTRONICS CORP., Miaoli (TW)

(72) Inventors: Jian Ping Syu, Taichung City (TW); Yu-Hao Wang, Pingtung County (TW); Hao-Zhi Lee, Miaoli (TW); Szu-Wei Chen, New Taipei City (TW); An-Cheng Liu, Taipei City (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 19/033,393

(22) Filed: Jan. 21, 2025

(65) Prior Publication Data

US 2026/0178195 A1 Jun. 25, 2026

(30) Foreign Application Priority Data

Dec. 24, 2024 (TW) ................................ 113150466

(51) Int. Cl.
*G06F 3/06* (2006.01)

(52) U.S. Cl.
CPC .......... *G06F 3/0611* (2013.01); *G06F 3/0631* (2013.01); *G06F 3/0679* (2013.01)

(58) Field of Classification Search
CPC ..... G06F 3/0611; G06F 3/0631; G06F 3/0679
USPC ...................................... 711/10, 12.008, 103
See application file for complete search history.

(56) References Cited

U.S. PATENT DOCUMENTS

| | | | | |
|---|---|---|---|---|
| 11,531,863 | B1 * | 12/2022 | Zweig | G06F 18/24 |
| 2016/0028728 | A1 * | 1/2016 | Hampel | H04L 9/3234 713/181 |
| 2018/0307535 | A1 * | 10/2018 | Suzuki | G06F 3/061 |
| 2019/0147344 | A1 * | 5/2019 | Zhang | G06N 3/063 706/25 |
| 2025/0028506 | A1 * | 1/2025 | Nagao | G06F 8/10 |
| 2025/0342059 | A1 * | 11/2025 | Wellum | G06F 9/542 |

* cited by examiner

*Primary Examiner* — Yaima Rigol
*Assistant Examiner* — Edward Waddy, Jr.
(74) *Attorney, Agent, or Firm* — JCIPRNET

(57) ABSTRACT

A memory management method, including: acquiring multiple architecture parameters of an artificial intelligence model; obtaining a memory allocation size used in a training process of the artificial intelligence model according to the multiple architecture parameters; configuring a target memory region in random access memory according to the memory allocation size, wherein train processing stage in the training process of the artificial intelligence model shares the target memory region; and temporarily storing intermediate data corresponding to each train processing stage of the training process of the artificial intelligence model in the target memory region, wherein the intermediate data is transferred between accelerator processor module, the random access memory, and a storage device. Thereby, the present invention can automatically calculate the optimized memory allocation size, and through the design of shared memory space, effectively improve memory fragmentation issues.

29 Claims, 7 Drawing Sheets

MEMORY MANAGEMENT METHOD, ARTIFICIAL INTELLIGENCE PROCESSING SYSTEM, AND COMPUTER PROGRAM PRODUCT FOR TRAINING-STAGE-BASED MEMORY ALLOCATION IN ARTIFICIAL INTELLIGENCE MODEL TRAINING

CROSS-REFERENCE TO RELATED APPLICATION

This application claims the priority benefit of Taiwan application serial no. 113150466, filed on Dec. 24, 2024. The entirety of the above-mentioned patent application is hereby incorporated by reference herein and made a part of this specification.

BACKGROUND

Technical Field

The present invention relates to a memory management method, an artificial intelligence processing system and a computer program product, and particularly relates to a memory management method, an artificial intelligence processing system and a computer program product that may automatically allocate and manage memory space during training process of an artificial intelligence model.

Description of Related Art

With the rapid development of artificial intelligence technology, large artificial intelligence models' training demands for computing resources are increasing day by day. In conventional artificial intelligence training systems, when training data volume exceeds memory capacity of a processing accelerator module, the system must temporarily store part of data to a storage device. In this process, the data transmission must be processed through random access memory.

However, existing technology has following problems: First, users need to manually set memory allocation parameters based on experience, which not only increases usage difficulty but also may affect system performance due to improper settings. Second, in conventional artificial intelligence training systems, different derivative products (also called intermediate data, such as: weight parameters, gradient parameters, optimization parameters, etc.) generated during training process of an artificial intelligence model are allocated in different memory spaces. This approach leads to inefficient memory usage, because the derivative products are actually used in different train processing stages during the training process of the artificial intelligence model, and allocating independent memory spaces causes idle memory space in unused train processing stages.

Furthermore, due to repeated allocation and release of the memory, memory fragmentation issues may easily occur. The memory fragmentation not only reduces memory usage efficiency but may also cause system performance degradation. These problems become more apparent especially when training large-scale artificial intelligence models, and may even affect training stability.

SUMMARY

In view of the above problems, the present invention provides a memory management method, an artificial intelligence processing system and a computer program product.

Through analyzing a plurality of architecture parameters of an artificial intelligence model, the present invention first automatically calculates memory space requirements of different train processing stages before executing training process, so as to set memory allocation size accordingly, and implements memory space sharing mechanism, so as to improve inefficient memory usage and memory fragmentation issues in existing technology, thereby avoiding latency issues caused by reading and writing reallocation of memory space.

An exemplary embodiment of the present invention provides a memory management method, adapted for an artificial intelligence processing system having a processor, a processing accelerator module, a random access memory and a storage device. The memory management method includes: obtaining a plurality of architecture parameters of an artificial intelligence model; obtaining a memory allocation size used in a training process of the artificial intelligence model according to the architecture parameters; configuring a target memory region in the random access memory according to the memory allocation size, wherein a plurality of train processing stages in the training process of the artificial intelligence model share the target memory region; and temporarily storing intermediate data corresponding to each train processing stage of the training process of the artificial intelligence model in the target memory region, wherein the intermediate data is transferred between the processing accelerator module, the random access memory, and the storage device.

An exemplary embodiment of the present invention provides an artificial intelligence processing system, including: a processor; a processing accelerator module, used for executing an artificial intelligence model; a random access memory; a storage device. The processor is electrically connected to the processing accelerator module, the random access memory and the storage device. The processor is configured by executing middleware to: obtain a plurality of architecture parameters of the artificial intelligence model; obtain a memory allocation size used in a training process of the artificial intelligence model according to the architecture parameters; configure a target memory region in the random access memory according to the memory allocation size, wherein a plurality of train processing stages in the training process of the artificial intelligence model share the target memory region; and temporarily store intermediate data corresponding to each train processing stage of the training process of the artificial intelligence model in the target memory region, wherein the intermediate data is transferred between the processing accelerator module, the random access memory, and the storage device.

An exemplary embodiment of the present invention provides a computer program product, including middleware. The middleware is executed by a processor of an artificial intelligence processing system to: obtain a plurality of architecture parameters of an artificial intelligence model, wherein the artificial intelligence model is executed by a processing accelerator module of the artificial intelligence processing system; obtain a memory allocation size used in a training process of the artificial intelligence model according to the architecture parameters; configure a target memory region in a random access memory of the artificial intelligence processing system according to the memory allocation size, wherein a plurality of train processing stages in the training process of the artificial intelligence model share the target memory region; and temporarily store intermediate data corresponding to each train processing stage of the training process of the artificial intelligence model in the target memory region, wherein the intermediate data is transferred between the processing accelerator module of the artificial intelligence processing system, the random access memory, and a storage device.

Based on the above, the memory management method, artificial intelligence processing system and computer program product provided by exemplary embodiments of the present invention may automatically calculate optimized memory allocation size according to a plurality of architecture parameters of an artificial intelligence model, including model architecture, continuous computation segment width, batch size, input data specification, number of computation units and parameter precision configuration information. By configuring a target memory region in random access memory and letting each train processing stage in training process of the artificial intelligence model share the target memory region, memory usage may be effectively reduced. Furthermore, through temporarily storing intermediate data corresponding to each train processing stage of the training process of the artificial intelligence model in the target memory region, and transferring data between the processing accelerator module, the random access memory and the storage device, memory fragmentation issues caused by traditional repeated allocation and release of memory space may be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Generally, a storage device (also called memory storage system) includes a rewritable non-volatile memory module and a controller (also called storage controller). The storage device may be used with an artificial intelligence processing system, so as to allow the artificial intelligence processing system to write data to the storage device or read data from the storage device.

Figure 1:
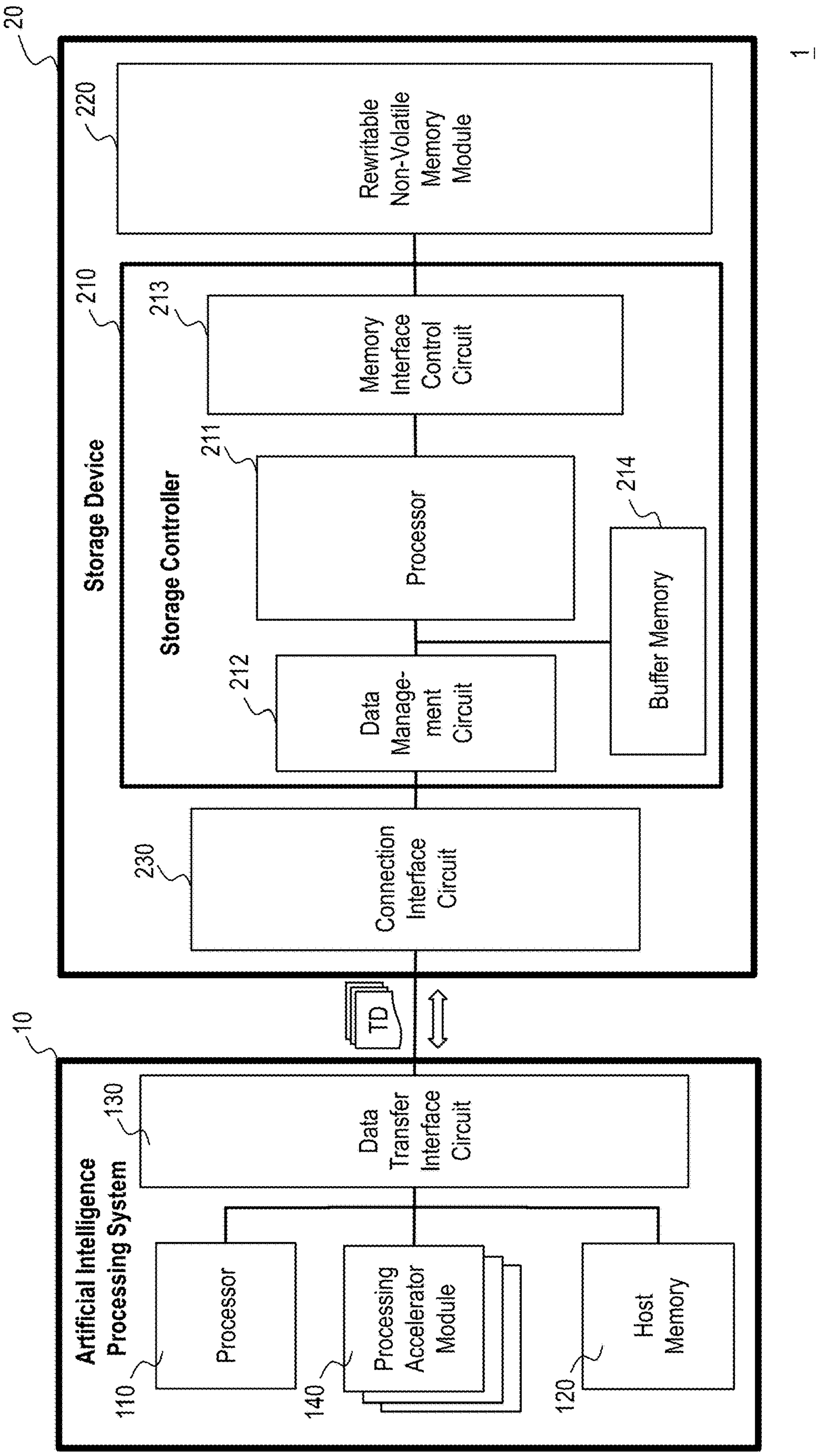
FIG. 1 is a block diagram of an artificial intelligence processing system and a storage device according to an exemplary embodiment of the present invention.

FIG. 1 is a block diagram of an artificial intelligence processing system and a storage device according to an exemplary embodiment of the present invention. Referring to FIG. 1, artificial intelligence PC 1 includes an artificial intelligence processing system 10 and a storage device 20. The artificial intelligence processing system 10 includes a processor (Processor) 110 (also called first processor), a host memory (Host Memory) 120, a data transfer interface circuit (Data Transfer Interface Circuit) 130 and a processing accelerator module 140. In this embodiment, the processor 110 is coupled (also called electrically connected) to the host memory 120, the data transfer interface circuit 130 and the processing accelerator module. In another embodiment, the processor (Processor) 110, the host memory 120, the data transfer interface circuit 130 and the processing accelerator module 140 are electrically connected to each other through a system bus (System Bus). In this embodiment, the processor 110, the host memory 120 and the data transfer interface circuit 130 may be disposed on a motherboard of the artificial intelligence processing system 10.

In an embodiment, the artificial intelligence processing system 10 (also called artificial intelligence model execution device) includes: a processor 110, for example Intel® i5-14500 central processor; a processing accelerator module 140, for example NVIDIA RTX 4060Ti graphics processor, which has 16 GB video memory; a host memory 120, for example DDR5 4800 specification memory, with capacity of 32 GB×2; a storage device 20, which has 2 TB operating system disk space (may be HDD or SSD); and a middleware (aiDAPTIVLink), used for managing data transfer between the processing accelerator module 140, the host memory 120 and the storage device 20.

In an embodiment, the artificial intelligence processing system is, for example, aiDAPTIV+ AI TPC launched by Phison. More specifically, the artificial intelligence processing system may include:

(1) Hardware layer: Cost Efficient GPU; Solid State Drive.

(2) Middleware layer (e.g., middleware): Middleware Library used to assist in managing data transfer between unit 10 and unit 20.

(3) Framework layer: artificial intelligence framework, for example PyTorch, TensorFlow. In an embodiment, the middleware may provide target memory region information to the framework layer. This target memory region information includes start address, size and access permission of the target memory region. More specifically, the processor 110 through executing the middleware, may obtain related information of the target memory region, including start memory address of the region in the host memory 120, allocated total capacity size, and read or write access permissions and other information. The processor 110 will provide this information to the framework layer, wherein the framework layer is an artificial intelligence computing development framework such as PyTorch. The processor 110 executes the framework layer to provide a program development interface to the artificial intelligence model.

(4) Application layer: Artificial intelligence applications.

In an embodiment, the artificial intelligence processing system 10 is suitable for executing various artificial intelligence models, including: Large Language Model (LLM), such as llama-3.1-8B or Llama-2-13B models; Image Generator, such as Stable diffusion SDXL models; speech recognition models, such as Whisper models.

In an embodiment, as the top layer of the artificial intelligence training system 10, the application layer may execute various artificial intelligence applications. These applications are mainly used for developing and training artificial intelligence models in specific domains. For example: (1) In the natural language processing field, developers may use interfaces provided by the application layer to train large language models such as Llama-2-13B, adjusting the model through domain-specific datasets to better understand industry-specific terminology and context. (2) In the computer vision field, developers may use image generation models such as Stable Diffusion SDXL as a foundation, training the model with the company's internal product image library to generate product illustrations that match corporate image.

In an embodiment, computing tasks supported by the artificial intelligence processing system 10 include: inference computation (Inference): executing trained models to perform prediction or generation tasks; and domain training (also called model training process): performing model training or fine-tuning for specific application domains.

Among these, the model training process includes multiple train processing stages: backward propagation stage: calculating gradients of loss function with respect to parameters; parameter update stage: updating model parameters; hybrid stage: combining operations of backward propagation and parameter update. In this training process, the artificial intelligence processing system 10 through the memory management method of the present invention, allows different train processing stages to share memory space, thereby effectively reducing memory usage. Even when using host memory 120 with smaller capacity, the artificial intelligence processing system 10 may still support training of larger-scale artificial intelligence models, and may be applied in artificial intelligence teaching, research and other fields.

The storage device 20 includes a storage controller 210, a rewritable non-volatile memory module 220 and a connection interface circuit 230. The storage controller 210 includes a processor 211, a data management circuit 212 and a memory interface control circuit 213.

In this embodiment, the artificial intelligence processing system 10 performs data access operations to the storage device 20 through electrical connection between the data transfer interface circuit 130 and the connection interface circuit 230 of the storage device 20. For example, the artificial intelligence processing system 10 may store data to the storage device 20 or read data from the storage device 20 through the data transfer interface circuit 130.

In this embodiment, the number of data transfer interface circuits 130 may be one or more. Through the data transfer interface circuit 130, the motherboard may be electrically connected to the storage device 20 via wired or wireless means. The storage device 20 may be, for example, a USB storage device, a memory card, a Solid State Drive (SSD) or a wireless memory storage device. The wireless memory storage device may be, for example, a Near Field Communication (NFC) memory storage device, a WiFi memory storage device, a Bluetooth memory storage device or a low power Bluetooth memory storage device (for example, iBeacon) and other memory storage devices based on various wireless communication technologies. Furthermore, the motherboard may also be electrically connected through the system bus to a Global Positioning System (GPS) module, network interface card, wireless transmission device, keyboard, screen, speaker and various I/O devices.

In this embodiment, the data transfer interface circuit 130 and the connection interface circuit 230 are interface circuits compatible with Peripheral Component Interconnect Express (PCI Express) standard or other types of standards. Moreover, data transmission between the data transfer interface circuit 130 and the connection interface circuit 230 is performed using Non-Volatile Memory express (NVMe) communication protocol or other types of standard communication protocols.

Additionally, in another embodiment, the connection interface circuit 230 may be packaged with the storage controller 210 in one chip, or the connection interface circuit 230 is disposed outside a chip containing the storage controller 210.

In an embodiment, the processing accelerator module 140 may include multiple Graphics Processing Units (GPU), Tensor Processing Units (TPU), Neural Processing Units (NPU), AI Accelerators or other processors suitable for executing artificial intelligence computations. The processing accelerator module 140 is used for executing artificial intelligence model. These processing accelerator modules 140 have parallel computing capabilities, particularly suitable for handling matrix operations, convolution operations and other large-scale parallel computing tasks in artificial intelligence models.

In an embodiment, the artificial intelligence model executed by the processing accelerator module 140 includes multiple model layers, wherein each model layer has one or more nodes (nodes between two model layers may be connected to each other), each model layer contains specific parameter amount and input data dimension corresponding to the one or more nodes. The training process of the artificial intelligence model may mainly be divided into multiple independently operating train processing stages, including: Forward stage, Backward stage and Update stage.

In an embodiment, the train processing stages include forward computation stage, wherein the artificial intelligence model executes inference computation according to input data to generate model prediction results. Specifically, in the forward computation stage, the artificial intelligence model will process sequentially from the first model layer to the last model layer, each model layer will perform computation processing on input data according to weight parameters of that model layer, and pass computation results as input data to the next layer, finally generating model prediction results.

In an embodiment, the train processing stages include backward propagation stage. In the backward propagation stage, first according to the difference between target output results (Target) predefined in the dataset and prediction results (Prediction) of the artificial intelligence model, a loss function value (also called error value) is calculated. Then, the system will use the loss function value, adopting backward propagation algorithm, starting from the last model layer of the artificial intelligence model, calculating, layer by layer forward, gradients corresponding to parameters (Weight/Parameter) of each model layer. The gradients represent the direction in which model parameters need to be adjusted to reduce the loss function value.

In an embodiment, the train processing stages include parameter update stage. In the parameter update stage, the system will use gradients calculated in the backward propagation stage, and according to a preset optimization algorithm (for example: Stochastic Gradient Descent, SGD or AdamW algorithm), calculate the update direction (also called parameter update direction) of model parameters. Then, the system will update parameters of the model according to the update direction, so as to enable the artificial intelligence model to generate prediction results closer to target results in the next training iteration.

In some embodiments, the backward propagation stage and parameter update stage may adopt a hybrid operation mode (also called hybrid stage), that is, specific model layers may simultaneously execute backward propagation stage and parameter update stage. In this training process, each train processing stage will execute corresponding data processing operations on each model layer in the artificial intelligence model sequentially according to its corresponding computation objective.

In the forward computation stage, the artificial intelligence model will execute computation sequentially from first layer to last layer to generate prediction results. In the backward propagation stage, the system will calculate gradients of loss function with respect to parameters of each layer. In the parameter update stage, the system will update model parameters according to the optimization algorithm.

In an embodiment, each train processing stage will generate intermediate data that needs to be temporarily stored, this intermediate data may include one or more of the following:

(1) Model parameters: including weight parameters stored in mixed precision (for example BF16) and weight parameters stored in high precision (for example FP32). In convolutional neural networks, these weight parameters may be filter weights of convolutional layers, for example a 3×3 convolution kernel may contain 9 weight values; in Transformer models, these weight parameters may be weights of Query, Key and Value matrices in Self-Attention mechanism.

(2) Gradient parameters: recording gradient values of loss function with respect to parameters of each layer. For example, in image classification tasks, when there is error between model prediction output and actual label, the system will calculate partial derivatives of loss function with respect to each weight parameter. If using Cross Entropy as loss function, gradient parameters indicate direction and magnitude for adjusting each weight parameter to reduce prediction error.

(3) Optimization parameters: including momentum parameters and variance parameters. Taking AdamW optimization algorithm as an example, momentum parameters record moving averages of past parameter updates, used to maintain inertia of parameter updates; variance parameters record moving averages of squared gradient terms, used for adaptively adjusting learning rate of each parameter. These parameters help model converge faster and avoid getting stuck in local minima.

(4) Activation values: recording output results of each layer. In convolutional neural networks for image processing, activation values may be feature maps processed by ReLU (Rectified Linear Unit) function, for example from original 224×224 pixel input image, after first convolution layer may obtain 64 112×112 feature maps; in language models, activation values may be word vector sequences output by each layer of Transformer encoder, whose dimensions may be 512 or 1024, etc.

These intermediate data may be used alternately in different train processing stages during the training process. For example, weight parameters are used in forward computation and backward propagation stages, gradient parameters are not used in forward propagation stage, while optimization parameters are used in parameter update stage, etc . . . Through analyzing these usage patterns, different stages may share the same memory space, thereby improving memory usage efficiency. For example, when processing an image classification model with 1000 categories, the final fully connected layer may have over 1 million weight parameters, these parameters may be stored in BF16 format during forward computation to save memory space, generate corresponding gradient parameters during backward propagation, and finally participate in computation with momentum parameters and variance parameters during parameter update to update the model.

In an embodiment, taking a large language model with 180 B (billion) parameters as an example, when using AdamW optimization algorithm for training, in mixed precision training mode:

(1) Weight parameters are stored in BF16 format, each parameter requires 2 bytes.

(2) Gradient parameters are stored in FP32 format, each parameter requires 4 bytes.

(3) Momentum and variance parameters are stored in FP32 format, each parameter requires 4 bytes.

In this case:

In the backward propagation stage, the system needs to access weight parameters in BF16 format and gradient parameters in FP32 format, and generate activation values.

In the parameter update stage, the system needs to access weight parameters in FP32 format, gradient parameters, momentum parameters and variance parameters.

If adopting hybrid operation mode, the system will execute parameter update of that model layer immediately after completing backward propagation computation of each model layer.

Through the memory management method of the present invention, the DRAM usage required for training large language models may be significantly reduced. For example, for a model with 180 B parameters, traditional methods may require 1 TB to 2 TB of DRAM, while after adopting the method of the present invention, only 64 GB or 128 GB of DRAM is needed to complete training. This reduction in memory usage mainly comes from the design of letting intermediate data of backward propagation stage and parameter update stage share memory space.

In this embodiment, the host memory 120 is used to temporarily store instructions or data executed by the processor 110. For example, in this embodiment, the host memory 120 may be Dynamic Random Access Memory (DRAM), Static Random Access Memory (SRAM), etc. However, it must be understood that the present invention is not limited to this, the host memory 120 may also be other suitable memory. The host memory 120 will be configured with a target memory region to temporarily store intermediate data TD during the training process of the artificial intelligence model.

The storage controller 210 is used to execute multiple logic gates or control instructions implemented in hardware form or firmware form and perform data writing, reading and erasing operations in the rewritable non-volatile memory module 220 according to instructions of the artificial intelligence processing system 10. More specifically, the processor 211 in the storage controller 210 is hardware with computing capability, which is used to control overall operation of the storage controller 210.

On the other hand, the processor 110 in the artificial intelligence processing system 10 is also hardware with computing capability, which is used to control overall operation of the artificial intelligence processing system 10. Specifically, the processor 110 is programmed by multiple control instructions/codes, and when the storage device 10 operates, these control instructions/codes will be executed to implement the memory management method provided by the present invention. In other embodiments, the control instructions/codes corresponding to the memory management method may further be implemented as hardware-form circuit units to implement the memory management method provided by the present invention.

It is worth mentioning that, in this embodiment, the processor 110 and processor 211 may be, for example, a Central Processing Unit (CPU), micro-processor, or other programmable processing units (Microprocessor), Digital Signal Processor (DSP), programmable controller, Application Specific Integrated Circuits (ASIC), Programmable Logic Device (PLD) or other similar circuit components, the present invention is not limited to this.

In this embodiment, the storage controller 210 further includes a data management circuit 212 and a memory interface control circuit 213.

Among these, the data management circuit 212 is electrically connected to the processor 211, the memory interface control circuit 213 and the connection interface circuit 230. The data management circuit 212 is used to accept instructions from processor 211 to perform data transfer. For example, reading data from the artificial intelligence processing system 10 (e.g., host memory 120) through the connection interface circuit 230, and writing the read data to the rewritable non-volatile memory module 220 through the memory interface control circuit 213 (e.g., performing write operation according to write instruction from the artificial intelligence processing system 10). Also for example, reading data from one or more physical units of the rewritable non-volatile memory module 220 through the memory interface control circuit 213 (data may be read from one or more storage units in one or more physical units), and writing the read data to the artificial intelligence processing system 10 (e.g., host memory 120) through the connection interface circuit 230 (e.g., performing read operation according to read instruction from the artificial intelligence processing system 10). In another embodiment, the data management circuit 212 may also be integrated into the processor 211.

The memory interface control circuit 213 is used to accept instructions from processor 211, cooperating with the data management circuit 212 to perform writing (also called programming) operations, read operations or erase operations on the rewritable non-volatile memory module 220.

Furthermore, data to be written to the rewritable non-volatile memory module 220 will be converted through the memory interface control circuit 213 into a format acceptable to the rewritable non-volatile memory module 220. Specifically, if processor 211 needs to access the rewritable non-volatile memory module 220, processor 211 will send corresponding command sequences to the memory interface control circuit 213 to instruct the memory interface control circuit 213 to execute corresponding operations. For example, these command sequences may include write command sequences for instructing writing data (e.g., intermediate data), read command sequences for instructing reading data (e.g., intermediate data), erase command sequences for instructing erasing data, and corresponding command sequences for instructing various memory operations. These command sequences may include one or more signals, or data on the bus. These signals or data may include instruction codes or program codes. For example, in a read command sequence, it will include read identifier, memory address, physical address and other information.

In an embodiment, the storage controller 210 further includes a buffer memory 214. The buffer memory is electrically connected to processor 211 and is used to temporarily store data and instructions from the artificial intelligence processing system 10, data from the rewritable non-volatile memory module 220 or other system data used to manage the storage device 20, so as to allow processor 211 to quickly access the data, instructions or system data from the buffer memory 214.

The rewritable non-volatile memory module 220 is electrically connected to the storage controller 210 (memory interface control circuit 213) and is used to store data written by the artificial intelligence processing system 10. The data may be, for example, architecture data of the artificial intelligence model or neural network model itself and/or intermediate data TD related to the artificial intelligence model or neural network model executed by processor 110.

In this embodiment, the rewritable non-volatile memory module 220 includes NAND flash memory, but the present invention is not limited to this. For example, in other embodiments, the rewritable non-volatile memory module 220 may be NOR flash memory, Phase Change Memory (PCM), Resistive Random-Access Memory (ReRAM) or other types of non-volatile memory.

Figure 2:
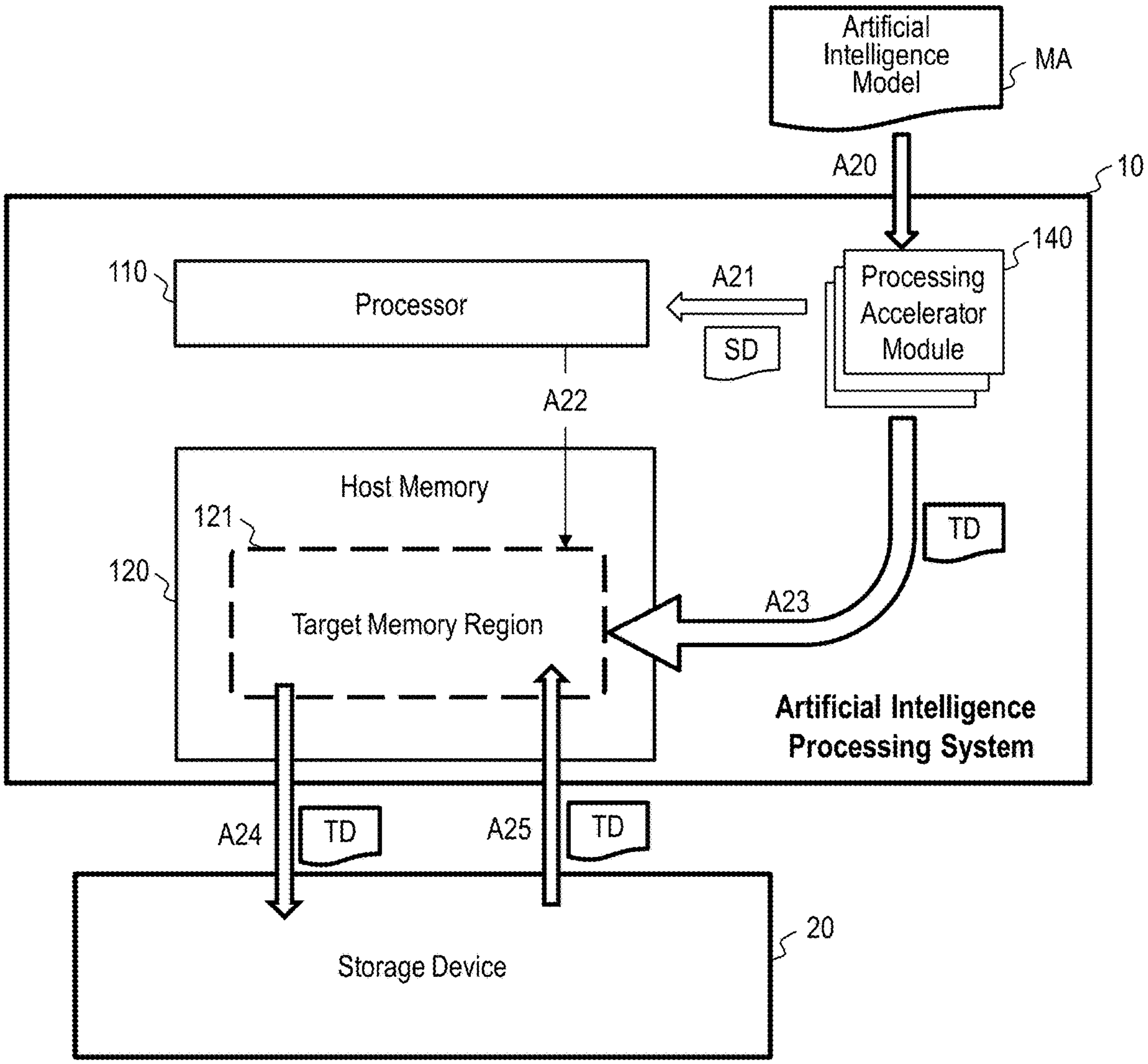
FIG. 2 is an operation diagram of an artificial intelligence processing system and a storage device applying the memory management method according to an exemplary embodiment of the present invention.

FIG. 2 is an operation diagram of an artificial intelligence processing system and a storage device applying the memory management method according to an exemplary embodiment of the present invention.

Referring to FIG. 2, FIG. 2 illustrates the data flow and interaction relationships between the processor 110, host memory 120, processing accelerator module 140 and storage device 20 in the artificial intelligence processing system 10.

In an embodiment, as shown by arrow A20, the artificial intelligence model MA is executed on the processing accelerator module 140.

As shown by arrow A21, the processor 110 obtains a plurality of architecture parameters SD from the processing accelerator module 140. These architecture parameters SD include: model architecture information, continuous computation segment width, batch size, input data specification, number of computation units and parameter precision configuration. In other embodiments, the architecture parameters SD may also be obtained from a database corresponding to the artificial intelligence model MA (for example, the database may be stored in the storage device 20).

In an embodiment, the plurality of architecture parameters obtained by processor 110 from the artificial intelligence model MA include:

(1) Model architecture information: parameter amount and input data dimension of each model layer of M model layers in the artificial intelligence model. For example, in a language model with Transformer architecture, each Transformer layer may contain self-attention mechanism and feed-forward neural network, wherein the parameter amount of the self-attention mechanism depends on hidden layer dimension (for example 1024), while the input data dimension may be the dimension of word embedding vector (for example 768).

(2) Continuous computation segment width: the continuous computation segment width is used to set the total number of model layers being simultaneously executed. For example, in a large language model with 48 layers, the continuous computation segment width may be set to 4, indicating that the system will simultaneously load and execute 4 consecutive transformer layers, and after completing computation of these 4 layers, load the next 4 layers for computation.

(3) Batch size: the batch size indicates the data processing amount of the training process. For example, in image classification tasks, batch size may be set to 32, indicating that the system processes 32 images simultaneously each time; in language model training, it may be set to 16, indicating that 16 text sequences are processed simultaneously each time.

(4) Input data specification: the input data specification includes image size or text sequence length. For example, in image processing tasks, input specification may be 224×224 pixel RGB images; in language processing tasks, it may be text sequences of length 512, with each sequence containing 512 tokens.

(5) Number of computation units: the number of computation units indicates the total number of target accelerators in the processing accelerator module 140 used for executing the artificial intelligence model. For example, the system may use 8 graphics processors for distributed training, with each graphics processor responsible for processing ⅛ of the overall model parameters, or use 4 graphics processors for data parallel processing, with each GPU processing different data batches.

(6) Parameter precision configuration: the parameter precision configuration defines precision types and byte numbers of weight parameters, gradient parameters and optimization parameters. For example, in mixed precision training, weight parameters in forward computation and backward propagation use BF16 format (2 bytes) to save memory space, while gradient accumulation and parameter update use FP32 format (4 bytes) to ensure numerical stability. Optimization parameters such as momentum and variance all use FP32 format to provide sufficient numerical precision.

(7) Update strategy: SGD model or AdamW model. For example, in traditional training process, the system will first complete backward propagation computation of all layers, then execute parameter update computation; in hybrid operation mode, the system will immediately execute parameter update of that layer after completing backward propagation computation of each layer. Taking mixed precision AdamW optimization algorithm as an example, when executing parameter update, each model layer will need five types of data: (1) weight parameters in BF16 format (2 bytes), (2) weight parameters in FP32 format (4 bytes), (3) gradient parameters in FP32 format (4 bytes), (4) momentum parameters in FP32 format (4 bytes), and (5) variance parameters in FP32 format (4 bytes). Calculating by parameter amount per layer, these parameters require a total of 18 bytes (2+4+4+4+4=18) of storage space. Through hybrid operation mode, the system may immediately release partial memory space of that layer after completing backward propagation, further improving memory usage efficiency.

As shown by arrow A22, the processor 110 calculates memory allocation size according to the plurality of architecture parameters and configures a target memory region 121 in the host memory 120. Specifically, the processor 110 first obtains a first memory usage amount of the backward propagation stage and a second memory usage amount of the parameter update stage in the training process of the artificial intelligence model. Then, the processor 110 selects the larger one from the first memory usage amount and the second memory usage amount as the memory allocation size for the training process of the artificial intelligence model. In the target memory region 121, it includes a first memory usage space configured for the backward propagation stage and a second memory usage space configured for the parameter update stage, wherein the first memory usage space and the second memory usage space at least partially overlap.

For example, in an embodiment, the overlapping design of the first memory usage space and the second memory usage space is based on the usage timing of different types of parameters in different stages during the artificial intelligence model training process. In the backward propagation stage, the first memory usage space is mainly used to store: (1) weight parameters stored in BF16 format, and (2) gradient parameters stored in FP32 format. While in the parameter update stage, the second memory usage space is mainly used to store: (1) weight parameters stored in FP32 format, (2) gradient parameters stored in FP32 format, (3) momentum parameters stored in FP32 format, and (4) variance parameters stored in FP32 format.

Taking mixed precision training with AdamW optimization algorithm as an example, assuming a model layer has 1 million parameters, in the backward propagation stage: weight parameters in BF16 format require 2 MB space (1 million×2 bytes); gradient parameters in FP32 format require 4 MB space (1 million×4 bytes), requiring a total of 6 MB first memory usage space.

While in the parameter update stage: weight parameters in FP32 format require 4 MB space (1 million×4 bytes); gradient parameters in FP32 format require 4 MB space (1 million×4 bytes); momentum parameters in FP32 format require 4 MB space (1 million×4 bytes); variance parameters in FP32 format require 4 MB space (1 million×4 bytes), requiring a total of 16 MB second memory usage space.

Since backward propagation stage and parameter update stage are not executed simultaneously, these two stages may share partial memory space. For example, the gradient parameter space (4 MB) used in backward propagation stage may be reused for gradient parameters in parameter update stage (also requiring 4 MB); the BF16 weight parameter space (2 MB) in backward propagation stage may serve as part of the weight parameter space (4 MB) in parameter update stage.

Through this overlapping design, for this model layer with 1 million parameters, only about 16 MB memory space needs to be allocated, rather than simply adding the memory requirements of two stages which would be 22 MB (6 MB+16 MB). This design may significantly reduce memory usage.

As shown by arrow A23, data generated when the processing accelerator module 140 executes the artificial intelligence model will be written to the target memory region 121 as intermediate data TD. For example, in the backward propagation stage, when the processing accelerator module 140 executes gradient computation, it will access stored weight parameters (e.g., in BF16 format) and write the calculated gradient parameters (e.g., in FP32 format) to the first memory usage space; in the parameter update stage, when the processing accelerator module 140 executes parameter update computation, it will access stored gradient parameters and write the updated weight parameters, momentum parameters and variance parameters to the second memory usage space. Since the first memory usage space and the second memory usage space at least partially overlap, and these parameters are used alternately in different stages, memory space may be effectively utilized, avoiding waste of memory resources.

As shown by arrow A24, when the target memory region 121 needs to store intermediate data TD to the storage device 20, processor 110 will control writing the intermediate data from the target memory region 121 to the storage device 20. Conversely, as shown by arrow A25, when the processing accelerator module 140 needs to use intermediate data TD in the storage device 20, processor 110 will control reading the intermediate data TD from the storage device 20 back to the target memory region 121, so as to allow the processing accelerator module 140 to use the intermediate data TD. This data transfer mechanism allows the processing accelerator module 140 to still execute training of large artificial intelligence models even with limited memory capacity.

Through the above architecture, this embodiment provides an effective memory management method. First, through analyzing the plurality of architecture parameters to automatically calculate memory allocation size, it avoids the problem of users needing to manually set memory parameters. Second, through letting the first memory usage space of backward propagation stage and second memory usage space of parameter update stage share the target memory region 121, it improves memory usage efficiency. Finally, through establishing effective data transfer mechanism between the processing accelerator module 140, the target memory region 121 and storage device 20, the system is able to support training requirements of large artificial intelligence models.

Figure 3A:
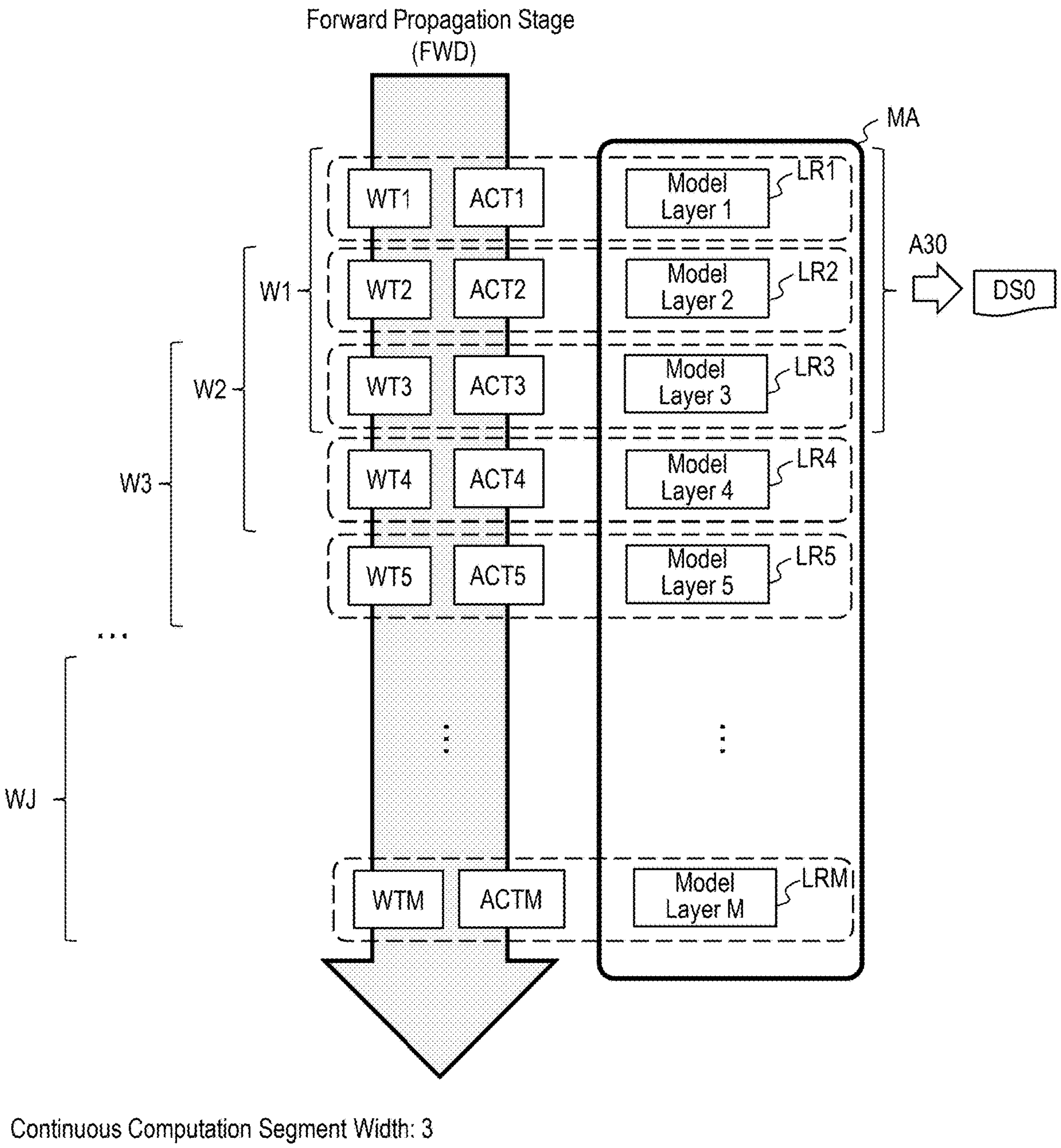
FIG. 3A is a diagram of continuous computation segments of a forward propagation stage according to an exemplary embodiment of the present invention.

FIG. 3A is a diagram of continuous computation segments of a forward propagation stage according to an exemplary embodiment of the present invention.

Referring to FIG. 3A, assuming artificial intelligence model MA has M model layers (LR1-LRM), wherein in the forward propagation stage which is one of multiple train processing stages, each model layer contains two types of intermediate data: weight parameters (WT1-WTM) and activation values (ACT1-ACTM).

In an embodiment, the processor 110 calculates a zeroth memory usage amount (also called forward memory usage amount) of the forward propagation stage. In an embodiment, obtaining the zeroth memory usage amount of the forward propagation stage of the training process of the artificial intelligence model includes: calculating a zeroth parameter memory requirement amount (also called forward parameter memory requirement amount) of each model layer according to a zeroth parameter amount (also called forward parameter amount) of each model layer of the M model layers in the forward propagation stage, a zeroth byte number (also called forward byte number) defined by the parameter precision configuration and the number of computation units; calculating an activation value memory requirement amount of each model layer according to the batch size, the input data specification, the input data dimension and an activation value byte number defined by the parameter precision configuration; calculating a zeroth model layer data amount (also called forward model layer data amount) corresponding to each model layer according to the zeroth parameter memory requirement amount and the activation value memory requirement amount; obtaining a plurality of zeroth continuous computation segment data amounts (also called forward continuous computation segment data amounts) according to the continuous computation segment width and the zeroth model layer data amount corresponding to each model layer, wherein an i-th zeroth continuous computation segment data amount is a sum of the zeroth model layer data amounts from an i-th model layer to a j-th model layer, wherein i is 1 to (M−(N−1)), N is the continuous computation segment width, j is i+(N−1); and setting a maximum value among the plurality of zeroth continuous computation segment data amounts as the zeroth memory usage amount.

For example, first, the processor 110 calculates the zeroth parameter memory requirement amount of each model layer. Specifically, for each model layer (for example model layer LR1), its memory requirement amount for weight parameters (WT1) is calculated as: multiplying the parameter amount of that model layer by the byte number defined by parameter precision configuration (for example weight parameters in BF16 format require 2 bytes), then dividing by the number of computation units (because parameters may be distributed across multiple computation units in the processing accelerator module).

Then, the processor 110 calculates the activation value memory requirement amount of each model layer. Taking the activation value (ACT1) of model layer LR1 as an example, its memory requirement amount is calculated as: multiplying batch size (indicating amount of data processed simultaneously) by input data specification (such as image size or text sequence length) and input data dimension, then multiplying by the activation value byte number defined by parameter precision configuration (for example FP32 format requires 4 bytes).

After that, the processor 110 adds the zeroth parameter memory requirement amount and activation value memory requirement amount of each model layer to obtain the zeroth model layer data amount corresponding to that model layer. As shown in FIG. 3A, continuous computation segment width (N) is 3, indicating that the system will simultaneously load and compute 3 consecutive model layers. The processor 110 calculates multiple zeroth continuous computation segment data amounts (W1-WJ) according to this continuous computation segment width. As shown by arrow A30, in this example DS0 represents the zeroth continuous computation segment data amount corresponding to the first continuous computation segment W1.

For example, the first continuous computation segment W1 (continuous computation segment width is 3) contains the sum of first model layer data amounts of model layers LR1, LR2 and LR3; the second continuous computation segment W2 contains the sum of first model layer data amounts of model layers LR2, LR3 and LR4, and so on. The range of starting model layer number i for each continuous computation segment is 1 to (M−(N−1)), where M is total number of model layers, N is continuous computation segment width (3 in this example, but the present invention is not limited to this). Each continuous computation segment contains model layers from layer i to layer j (j=i+(N−1)).

Finally, the processor 110 selects the maximum value from these continuous computation segment data amounts as the zeroth memory usage amount of the forward propagation stage.

Also for example, referring to FIG. 3A, when calculating the zeroth memory usage amount of forward propagation stage, the processor 110 executes the following steps in sequence:

(1) Calculate parameter memory requirement amount of each model layer (corresponding to weight parameters WT1-WTM in FIG. 3A): parameter memory requirement amount=[model layer parameter amount]×[parameter precision byte number]÷[number of computation units]. For example, assuming a model layer has 1 million parameters, weight parameters use BF16 format (2 bytes), and using 4 processing accelerators for distributed computation, then the parameter memory requirement amount of that layer is: (1,000,000)×2÷4=500,000 bytes.

(2) Calculate input data memory requirement amount of each model layer: input data memory requirement amount=[batch size]×[input data specification]×[precision byte number]. For example, if batch size is 32, input is text sequence of length 512 (input data specification), and using FP32 format (4 bytes), then input data memory requirement amount is: 32×512×4=65,536 bytes.

(3) Calculate activation value memory requirement amount of each model layer (corresponding to ACT1-ACTN in FIG. 3A): activation value memory requirement amount=[batch size]×[output data dimension]×[precision byte number]. For example, if batch size is 32, output dimension is 1024, and using FP32 format (4 bytes), then activation value memory requirement amount is: 32×1024×4=131,072 bytes.

(4) Calculate zeroth model layer data amount of each model layer: zeroth model layer data amount=parameter memory requirement amount+input data memory requirement amount+activation value memory requirement amount. Following the above example, the zeroth model layer data amount of that layer is: 500,000+65,536+131,072=696,608 bytes.

(5) Calculate continuous computation segment data amounts: as shown in FIG. 3A, continuous computation segment width N is 3, the system will calculate data amounts of multiple continuous computation segments (W1-WJ). The zeroth continuous computation segment data amount DS0 for each continuous computation segment Wi is calculated as: DS0=zeroth model layer data amount of i-th layer+zeroth model layer data amount of (i+1)-th layer+zeroth model layer data amount of (i+2)-th layer.

As shown by arrow A30, DS0 represents the zeroth continuous computation segment data amount corresponding to continuous computation segment W1. For example, assuming different layers have different data amounts: LR1 (self-attention layer): 696,608 bytes; LR2 (feed-forward neural network layer): 835,930 bytes; LR3 (self-attention layer): 696,608 bytes; LR4 (feed-forward neural network layer): 835,930 bytes; LR5 (self-attention layer): 696,608 bytes.

Then the data amounts of continuous computation segments are calculated as follows (taking three segments as example): W1 data amount=LR1+LR2+LR3=696,608+835,930+696,608=2,229,146 bytes; W2 data amount=LR2+LR3+LR4=835,930+696,608+835,930=2,368,468 bytes; W3 data amount=LR3+LR4+LR5=696,608+835,930+696,608=2,229,146 bytes.

(6) Obtain zeroth memory usage amount: zeroth memory usage amount=MAX(W1 data amount, W2 data amount, W3 data amount)=MAX(2,229,146, 2,368,468, 2,229,146)=2,368,468 bytes. In this example, since W2 contains two feed-forward neural network layers (LR2 and LR4), its data amount is the largest. This value (zeroth memory usage amount, 2,368,468 bytes) will be used to determine the size of memory space allocated for forward propagation stage use in the target memory region.

It is worth noting that, compared to backward propagation stage (FIG. 3B), forward propagation stage does not need to store gradient parameters, therefore its memory requirement is usually smaller. Thus, in an embodiment, processor 110 does not need to calculate the zeroth memory usage amount in forward propagation stage (because the first memory usage amount of backward propagation stage may be used instead).

Figure 3B:
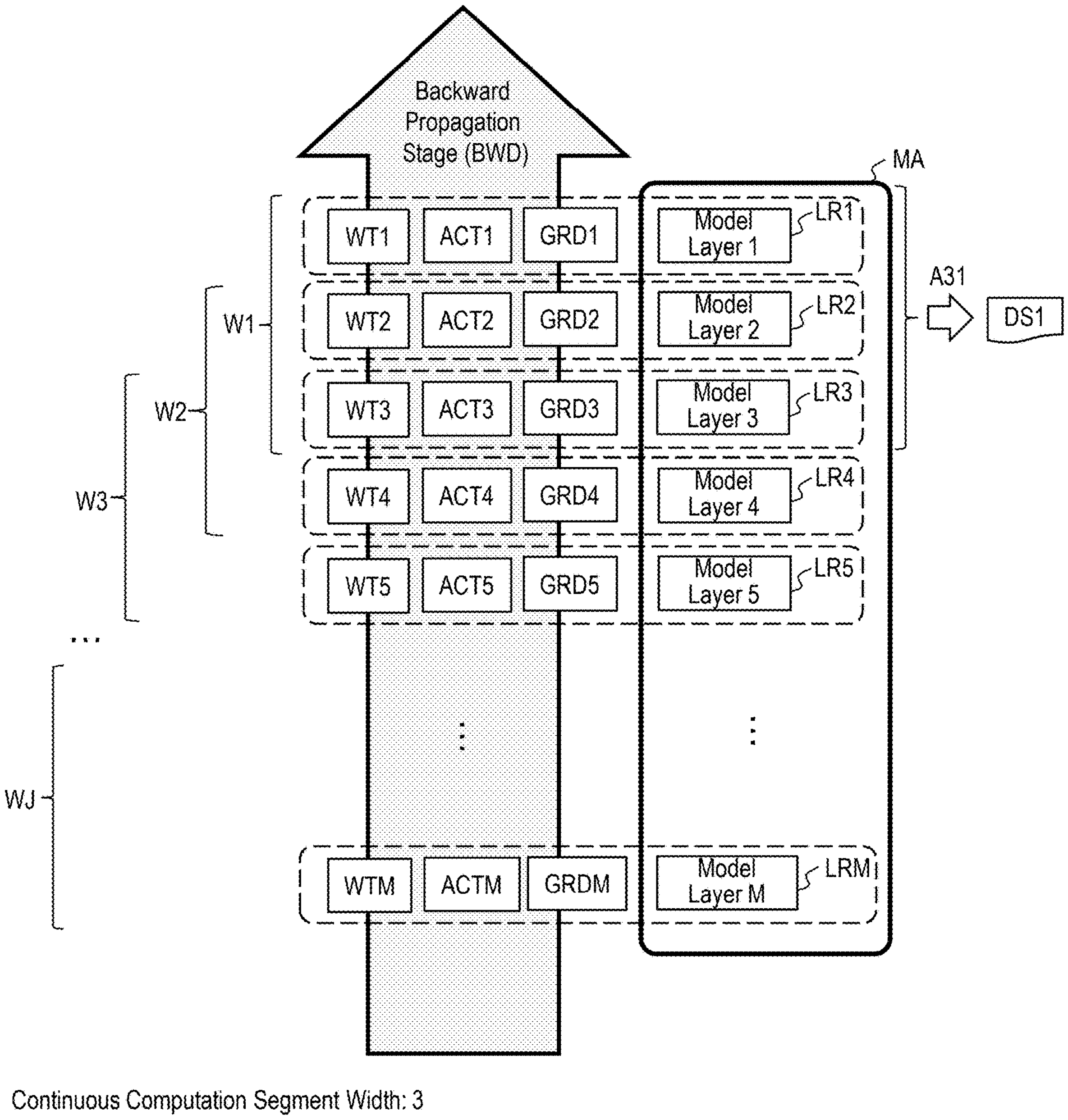
FIG. 3B is a diagram of continuous computation segments of a backward propagation stage according to an exemplary embodiment of the present invention.

FIG. 3B is a diagram of continuous computation segments of a backward propagation stage according to an exemplary embodiment of the present invention.

Referring to FIG. 3B, assuming artificial intelligence model MA has M model layers (LR1-LRM), wherein each model layer in backward propagation stage contains three types of intermediate data: weight parameters (WT1-WTM), activation values (ACT1-ACTM) and gradient parameters (GRD1-GRDM).

In an embodiment, the processor 110 calculates a first memory usage amount of the backward propagation stage. In an embodiment, obtaining the first memory usage amount of the backward propagation stage of the training process of the artificial intelligence model includes: calculating a first parameter memory requirement amount of each model layer according to a first parameter amount of each model layer of the M model layers in the backward propagation stage, a first byte number defined by the parameter precision configuration and the number of computation units; calculating an activation value memory requirement amount of each model layer according to the batch size, the input data specification, the input data dimension and an activation value byte number defined by the parameter precision configuration; calculating a first model layer data amount corresponding to each model layer according to the first parameter memory requirement amount and the activation value memory requirement amount; obtaining a plurality of first continuous computation segment data amounts according to the continuous computation segment width and the first model layer data amount corresponding to each model layer, wherein an i-th first continuous computation segment data amount is a sum of the first model layer data amounts from an i-th model layer to a j-th model layer, wherein i is 1 to (M−(N−1)), N is the continuous computation segment width, j is i+(N−1); and setting a maximum value among the plurality of first continuous computation segment data amounts as the first memory usage amount.

For example, first, the processor 110 calculates the first parameter memory requirement amount of each model layer. Specifically, for each model layer (for example model layer LR1), its memory requirement amount for weight parameters (WT1) and gradient parameters (GRD1) is calculated as: multiplying the parameter amount of that model layer by the byte number defined by parameter precision configuration (for example weight parameters in BF16 format require 2 bytes, gradient parameters in FP32 format require 4 bytes), then dividing by the number of computation units (because parameters may be distributed across multiple computation units in the processing accelerator module).

Then, the processor 110 calculates the activation value memory requirement amount of each model layer. Taking the activation value (ACT1) of model layer LR1 as an example, its memory requirement amount is calculated as: multiplying batch size (indicating amount of data processed simultaneously) by input data specification (such as image size or text sequence length) and input data dimension, then multiplying by the activation value byte number defined by parameter precision configuration (for example FP32 format requires 4 bytes).

After that, the processor 110 adds the first parameter memory requirement amount and activation value memory requirement amount of each model layer to obtain the first model layer data amount corresponding to that model layer. As shown in FIG. 3B, continuous computation segment width (N) is 3, indicating that the system will simultaneously load and compute 3 consecutive model layers. The processor 110 calculates multiple first continuous computation segment data amounts (corresponding to W1-WJ) according to this continuous computation segment width. As shown by arrow A31, in this example DS1 represents the first continuous computation segment data amount corresponding to continuous computation segment W1.

For example, the first continuous computation segment W1 (continuous computation segment width is 3) contains the sum of first model layer data amounts of model layers LR1, LR2 and LR3; the second continuous computation segment W2 contains the sum of first model layer data amounts of model layers LR2, LR3 and LR4, and so on. The range of starting model layer number i for each continuous computation segment is 1 to (M−(N−1)), where M is total number of model layers, N is continuous computation segment width (3 in this example, but the present invention is not limited to this). Each continuous computation segment contains model layers from layer i to layer j (j=i+(N−1)).

Finally, the processor 110 selects the maximum value from these continuous computation segment data amounts as the first memory usage amount of the backward propagation stage. This first memory usage amount will be used to determine the size of memory space allocated for backward propagation stage use in the target memory region. For example, the size of memory space allocated for backward propagation stage use may be the first memory usage amount.

Also for example, referring to FIG. 3B, when calculating the first memory usage amount of backward propagation stage, the processor 110 executes the following steps in sequence:

(1) Calculate first parameter memory requirement amount of each model layer (corresponding to weight parameters WT1-WTM and gradient parameters GRD1-GRDM in FIG. 3B): first parameter memory requirement amount=2×[model layer parameter amount]×[parameter precision byte number]÷[number of computation units]. For example, assuming a model layer has 1 million parameters, weight parameters use BF16 format (2 bytes), gradient parameters use FP32 format (4 bytes), and using 4 processing accelerators for distributed computation, then the first parameter memory requirement amount of that layer is: 2×(1,000,000)×(2+4)÷4=3,000,000 bytes.

This step needs to multiply by 2 because when training neural networks, in addition to storing the model's weights (that is, parameters learned by the model), additional storage is needed for gradients used in optimization. The parameter amount refers to the total number of adjustable parameters in this neural network layer. The storage space size of these parameters will be affected by our choice of numerical precision. For example, when using BF16 format (a more memory-efficient floating-point format), each parameter only needs to occupy 2 bytes. The reason for dividing by GPU number is: when we use multiple GPUs to train the model, these parameters will be distributed to different GPUs to accelerate computation. Therefore, each GPU only needs to store a portion of the parameters.

(2) Calculate activation value memory requirement amount of each model layer (corresponding to ACT1-ACTM in FIG. 3B): activation value memory requirement amount=[batch size]×[input data specification]×[input data dimension]×[activation value precision byte number]. For example, if batch size is 32, input is text sequence of length 512, embedding dimension per token is 1024, activation values are stored in FP32 format (4 bytes), then the activation value memory requirement amount of that layer is: 32×512×1024×4=67,108,864 bytes.

(3) Calculate first model layer data amount of each model layer: first model layer data amount=first parameter memory requirement amount+(activation value memory requirement amount×[offload flag]). The offload flag is a boolean value (0 or 1), indicating whether activation values (also called activation values) need to be offloaded to external storage. If offload flag is 1, then the memory space requirement for activation value usage needs to be considered further; otherwise (0), only the memory space usage for weights and gradients needs to be considered.

Following the above example, if activation values need to be stored ([offload flag]=1), then the first model layer data amount of that layer is: 3,000,000+(67,108,864×1)=70,108,864 bytes.

(4) Calculate continuous computation segment data amounts: as shown in FIG. 3B, continuous computation segment width N is 3, the system will calculate data amounts of multiple continuous computation segments (corresponding to W1-WJ). The continuous computation segment data amount DS1 for each continuous computation segment Wi is calculated as: DS1=first model layer data amount of i-th layer+first model layer data amount of (i+1)-th layer+first model layer data amount of (i+(N−1))-th layer. Here, i ranges from 1 to (M−2), where M is total number of model layers. As shown by arrow A31, DS1 represents the first continuous computation segment data amount corresponding to continuous computation segment W1.

For example, assuming different model layers in the transformer model have different first block data amounts due to different structures:

LR1 (self-attention layer): first model layer data amount is 70,108,864 bytes; LR2 (feed-forward neural network layer): first model layer data amount is 85,324,800 bytes; LR3 (self-attention layer): first model layer data amount is 70,108,864 bytes; LR4 (feed-forward neural network layer): first model layer data amount is 85,324,800 bytes; LR5 (self-attention layer): first model layer data amount is 70,108,864 bytes.

Then the continuous computation segment data amounts are: W1=70,108,864+85,324,800+70,108,864=225,542,528 bytes (containing LR1, LR2, LR3); W2=85,324,800+70,108,864+85,324,800=240,758,464 bytes (containing LR2, LR3, LR4); W3=70,108,864+85,324,800+70,108,864=225,542,528 bytes (containing LR3, LR4, LR5).

(5) Obtain first memory usage amount: first memory usage amount=MAX(W1 data amount, W2 data amount, . . . , WJ data amount). In this example, the data amount corresponding to W2 is the largest (reflecting the peak memory requirement of the entire backward propagation process), therefore, processor 110 will select W2 data amount, 240,758,464 bytes as the first memory usage amount of backward propagation stage.

Through the above calculation process, the system may accurately evaluate the maximum memory usage required when simultaneously loading N consecutive model layers at any time during backward propagation stage, thereby optimizing memory space allocation. This calculation method considers parameter memory requirements, activation value storage strategy, and characteristics of distributed computing, thereby effectively allocating memory space.

Figure 3C:
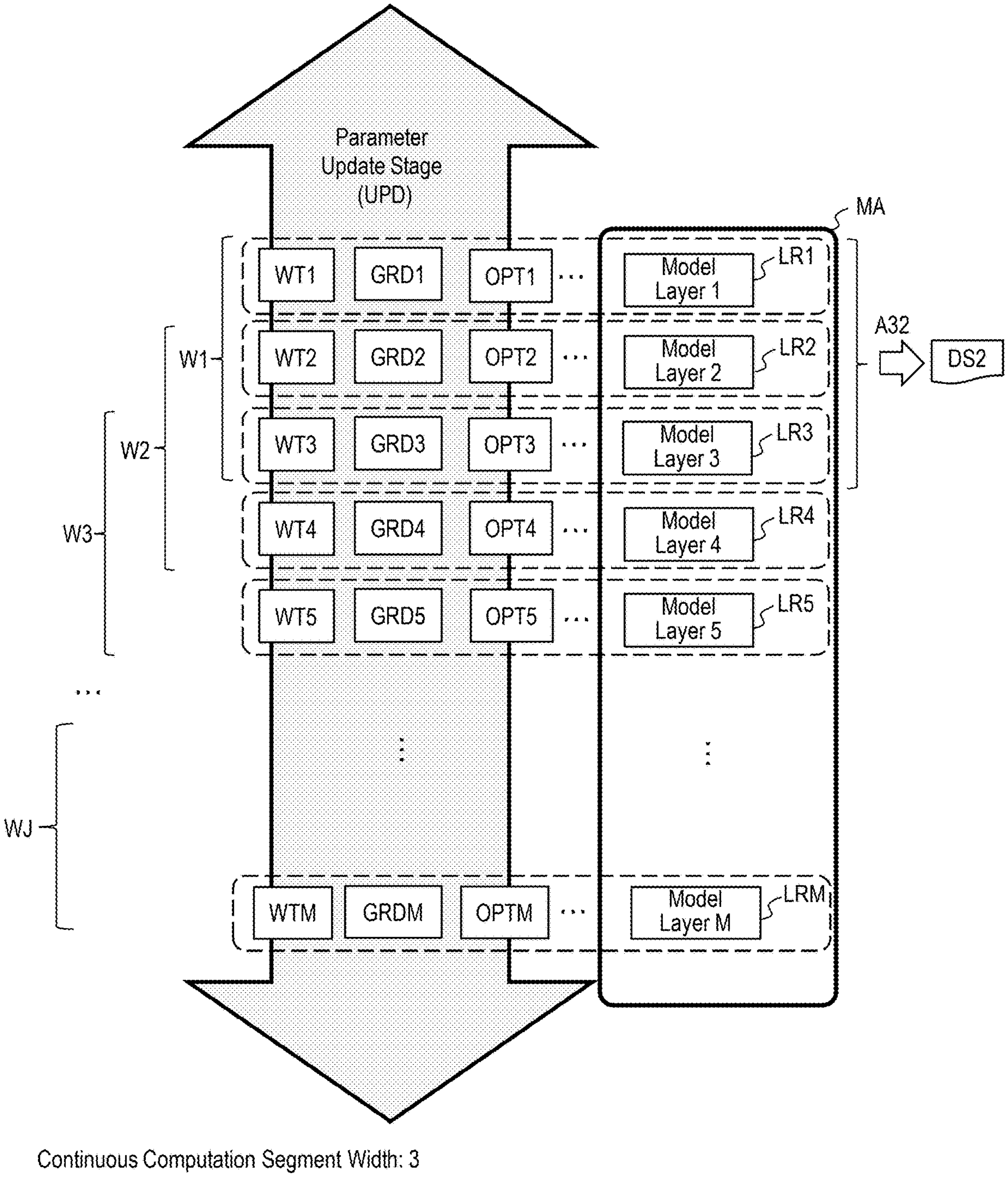
FIG. 3C is a diagram of continuous computation segments of a parameter update stage according to an exemplary embodiment of the present invention.

FIG. 3C is a diagram of continuous computation segments of a parameter update stage according to an exemplary embodiment of the present invention.

Referring to FIG. 3C, assuming artificial intelligence model MA has M model layers (LR1-LRN), wherein each model layer in parameter update stage contains three types of intermediate data: weight parameters (WT1-WTM), gradient parameters (GRD1-GRDM) and optimization parameters (OPT1-OPTM). It should be noted that each layer may contain multiple types of optimization parameters, for example when using AdamW optimization algorithm, the optimization parameters of each layer will include momentum parameters (such as OPT1 corresponding to model layer 1 LR1) and variance parameters (such as OPT1.1 corresponding to model layer 1 LR1 (not shown)).

In an embodiment, the processor 110 calculates a second memory usage amount of the parameter update stage.

In an embodiment, obtaining the second memory usage amount of the parameter update stage of the training process of the artificial intelligence model includes:

First, the processor 110 calculates the second parameter memory requirement amount of each model layer. Specifically, for each model layer (for example model layer LR1), multiply the second parameter amount of that model layer (including parameter amounts of weight parameters WT1 in FP32 format, gradient parameters GRD1, momentum parameters and variance parameters of that model layer) by the second byte number defined by parameter precision configuration (for example FP32 format requires 4 bytes), then divide by the number of computation units (because parameters may be distributed across multiple computation units in the processing accelerator module).

Then, the processor 110 sets the second parameter memory requirement amount of each model layer as the second model layer data amount corresponding to that model layer. Since activation values do not need to be stored in parameter update stage, the second model layer data amount only contains the second parameter memory requirement amount. As shown in FIG. 3C, continuous computation segment width (N) is 3, indicating that the system will simultaneously load and compute 3 consecutive model layers. The processor 110 calculates multiple second continuous computation segment data amounts (W1-WJ) according to this continuous computation segment width. As shown by arrow A32, in this example DS2 represents the second continuous computation segment data amount corresponding to continuous computation segment W1.

For example, the first continuous computation segment W1 contains the sum of second model layer data amounts of model layers LR1, LR2 and LR3; the second continuous computation segment W2 contains the sum of second model layer data amounts of model layers LR2, LR3 and LR4, and so on. The range of starting model layer number i for each continuous computation segment is 1 to (M−(N−1)), where M is total number of model layers, N is continuous computation segment width (3 in this example). Each continuous computation segment contains model layers from layer i to layer j (j=i+(N−1)).

Finally, the processor 110 selects the maximum value from these second continuous computation segment data amounts as the second memory usage amount of parameter update stage. This second memory usage amount will be used to determine the size of memory space allocated for parameter update stage use in the target memory region. For example, the size of memory space allocated for parameter update stage use may be the second memory usage amount.

Referring to FIG. 3C, when calculating the second memory usage amount of parameter update stage, the processor 110 executes the following steps in sequence:

(1) Calculate data amount needed for each update block (Update Block). Taking mixed precision AdamW optimization algorithm as an example, each update block needs five types of data: weight parameters in BF16 format (2 bytes); weight parameters in FP32 format (4 bytes); gradient parameters in FP32 format (4 bytes); momentum parameters in FP32 format (4 bytes); variance parameters in FP32 format (4 bytes).

The second parameter memory requirement amount of each model layer is calculated as: second parameter memory requirement amount=[model layer parameter amount]×[total precision requirement byte number]÷[number of computation units]. Here, total precision requirement byte number=2+4+4+4+4=18. For example, assuming a model layer has 1 million parameters, using 4 processing accelerators for distributed computation, then the second parameter memory requirement amount of that layer is: (1,000,000)×18÷4=4,500,000 bytes.

(2) Calculate continuous computation segment data amount of each continuous computation segment. As shown in FIG. 3C, when continuous computation segment width (N) is 3, starting from the i-th model layer of the model, add memory requirements of 3 consecutive model layers. The second continuous computation segment data amount DS2 for each continuous computation segment Wi is calculated as: second continuous computation segment data amount=second parameter memory requirement amount of i-th layer+second parameter memory requirement amount of (i+1)-th layer+second parameter memory requirement amount of (i+(N−1))-th layer.

For example, assuming in transformer model: LR1 (self-attention layer): 4,500,000 bytes; LR2 (feed-forward neural network layer): 5,400,000 bytes; LR3 (self-attention layer): 4,500,000 bytes.

As shown by arrow A32, DS2 represents the second continuous computation segment data amount corresponding to continuous computation segment W1: DS2=4,500,000+5,400,000+4,500,000=14,400,000 bytes.

This calculation process will be repeated until covering all layers of the artificial intelligence model MA, to find the maximum continuous computation segment data amount. Each time moving one layer, calculating the continuous computation segment data amount in the new continuous computation segment, ensuring consideration of all possible memory usage situations that may appear during update process.

Through the above method, we can obtain multiple second continuous computation segment data amounts (taking M=5 as example, assuming total 5 model layers). For example: W1 data amount=14,400,000 bytes (containing LR1, LR2, LR3); W2 data amount=15,300,000 bytes (containing LR2, LR3, LR4); W3 data amount=14,400,000 bytes (containing LR3, LR4, LR5).

As shown by arrow A32, DS2 represents the second continuous computation segment data amount corresponding to the first continuous computation segment W1, which is 14,400,000 bytes. In parameter update stage, artificial intelligence model MA needs to simultaneously process five different types of parameter data: weight parameters in BF16 format (2 bytes), weight parameters in FP32 format (4 bytes), gradient parameters in FP32 format (4 bytes), momentum parameters in FP32 format (4 bytes) and variance parameters in FP32 format (4 bytes). Therefore, for each parameter in the model, it actually requires 18 bytes (2+4+4+4+4=18) of memory space to store all data needed in parameter update stage.

It is worth noting that feed-forward neural network layers (for example LR2, LR4) typically have larger parameter amounts, therefore their memory requirements (5,400,000 bytes) will be higher than self-attention layers (4,500,000 bytes). This difference is reflected in continuous computation segment data amounts, for example W2's data amount (15,300,000 bytes) is larger than W1 and W3's data amounts (14,400,000 bytes), this is because W2 contains two feed-forward neural network layers (LR2 and LR4).

Through the above calculation process, the system may accurately evaluate the memory usage required when simultaneously loading N consecutive model layers at any time during parameter update stage. This calculation method considers parameter requirements of different precision formats and characteristics of distributed computing, thereby effectively allocating memory space. It is worth noting that in parameter update stage, due to the need to simultaneously maintain weight parameters in BF16 format (2 bytes), weight parameters in FP32 format (4 bytes), gradient parameters (4 bytes), momentum parameters (4 bytes) and variance parameters (4 bytes), each parameter position requires 18 bytes of memory space. In comparison, forward propagation stage only needs weight parameters in BF16 format (2 bytes) for each parameter, with smaller memory requirements. Additionally, although forward propagation stage also needs to store activation values (4 bytes), activation value calculation is independent of parameter amount and instead depends on batch size, input data specification and input data dimension.

Figure 3D:
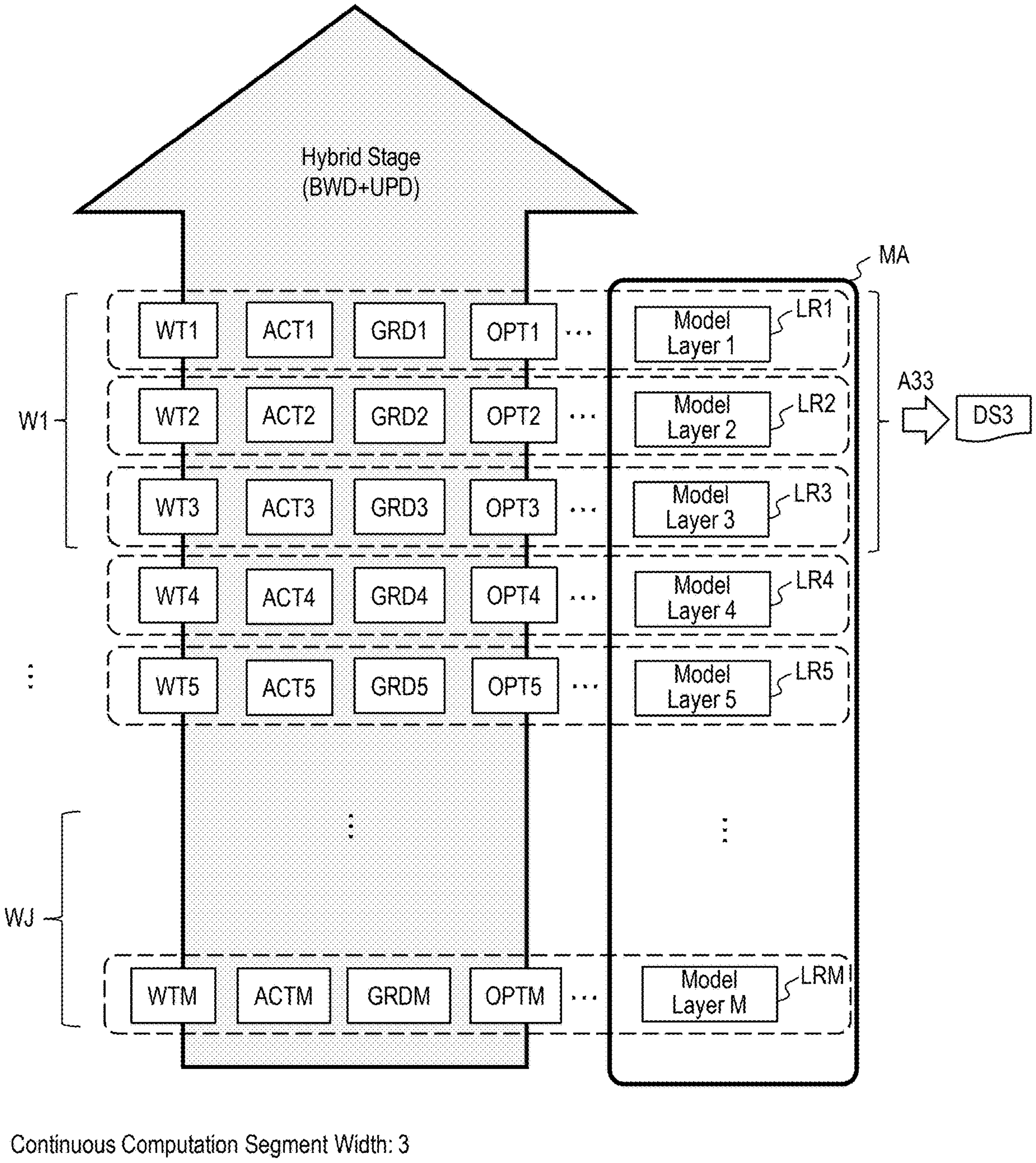
FIG. 3D is a diagram of continuous computation segments of a hybrid stage according to an exemplary embodiment of the present invention.

Referring to FIG. 3D, assuming artificial intelligence model MA has M model layers (LR1-LRM), wherein each model layer in hybrid stage contains four types of intermediate data: weight parameters (WT1-WTM), activation values (ACT1-ACTM), gradient parameters (GRD1-GRDM) and optimization parameters (OPT1-OPTM). These intermediate data reflect that in hybrid stage, the system simultaneously executes backward propagation computation and parameter update computation.

In an embodiment, the processor 110 first determines whether the training process of the artificial intelligence model uses hybrid stage. If determining to use hybrid stage, processor 110 calculates a third memory usage amount of the hybrid stage. In an embodiment, obtaining the third memory usage amount of the hybrid stage of the training process of the artificial intelligence model includes: adding the first model layer data amount in backward propagation stage and the second model layer data amount in parameter update stage of each model layer to obtain the model layer data amount in hybrid stage of that model layer; calculating multiple hybrid continuous computation segment data amounts according to continuous computation segment width and hybrid stage model layer data amount of each model layer.

When calculating the third memory usage amount of hybrid stage, the processor 110 executes the following steps in sequence:

(1) Calculate first model layer data amount of each model layer in backward propagation stage: first model layer data amount=(2×[model layer parameter amount]×[parameter precision byte number]÷[number of computation units])+([batch size]×[input data specification]×[input data dimension]×[activation value precision byte number]). In an embodiment, this step considers, for example: memory requirements for weight parameters in BF16 format; memory requirements for gradient parameters in FP32 format; memory requirements for activation values.

(2) Calculate second model layer data amount of each model layer in parameter update stage: second model layer data amount=[model layer parameter amount]×[total precision requirement byte number (e.g., 18 bytes)]÷[number of computation units]. In an embodiment, this step considers, for example: weight parameters in BF16 format (e.g., 2 bytes); weight parameters in FP32 format (e.g., 4 bytes); gradient parameters in FP32 format (e.g., 4 bytes); momentum parameters in FP32 format (e.g., 4 bytes); variance parameters in FP32 format (e.g., 4 bytes).

(3) Calculate model layer data amount of each model layer in hybrid stage: hybrid model layer data amount=first model layer data amount+second model layer data amount.

For example, assuming in transformer model, for self-attention layer: model layer parameter amount is 1 million, batch size is 32, input sequence length is 512, input dimension is 1024, using 4 processing accelerators for distributed computation.

The calculation of first model layer data amount is: (a) BF16 weights and FP32 gradients: 2×1,000,000×(2+4)÷4=3,000,000 bytes; (b) activation values: 32×512×1024×4=67,108,864 bytes. Total first model layer data amount is: 70,108,864 bytes.

The calculation of second model layer data amount is: 1,000,000×18÷4=4,500,000 bytes.

Therefore, the model layer data amount of this self-attention layer in hybrid stage is: 70,108,864+4,500,000=74,608,864 bytes.

Similarly, for feed-forward neural network layer (assuming parameter amount is 1.2 million): First model layer data amount is: (a) BF16 weights and FP32 gradients: 2×1,200,000×(2+4)÷4=3,600,000 bytes; (b) activation values: 32×512×1024×4=67,108,864 bytes Total is: 70,708,864 bytes. Furthermore, second model layer data amount is: 1,200,000×18÷4=5,400,000 bytes.

Therefore, the model layer data amount of this feed-forward neural network layer in hybrid stage is: 70,708,864+5,400,000=76,108,864 bytes.

(4) Calculate continuous computation segment data amounts: as shown in FIG. 3D, continuous computation segment width N is 3, the system will calculate data amounts of multiple continuous computation segments (W1-WJ). The hybrid continuous computation segment data amount DS3 for each continuous computation segment Wi is calculated as: DS3=hybrid model layer data amount of i-th layer+hybrid model layer data amount of (i+1)-th layer+hybrid model layer data amount of (i+2)-th layer.

For example, assuming different layers have different hybrid model layer data amounts (taking M=5 as example, assuming total 5 model layers), LR1 (self-attention layer): 74,608,864 bytes; LR2 (feed-forward neural network layer): 76,108,864 bytes; LR3 (self-attention layer): 74,608,864 bytes; LR4 (feed-forward neural network layer): 76,108,864 bytes; LR5 (self-attention layer): 74,608,864 bytes.

Then the hybrid continuous computation segment data amounts are: W1 data amount=LR1+LR2+LR3=74,608,864+76,108,864+74,608,864=225,326,592 bytes; W2 data amount=LR2+LR3+LR4=76,108,864+74,608,864+76,108,864=226,826,592 bytes; W3 data amount=LR3+LR4+LR5=74,608,864+76,108,864+74,608,864=225,326,592 bytes.

(5) Obtain third memory usage amount (taking M=5 as example): third memory usage amount=MAX(W1 data amount, W2 data amount, W3 data amount)=MAX(225,326,592, 226,826,592, 225,326,592)=226,826,592 bytes. This value (third memory usage amount, 226,826,592 bytes) will be used to determine the size of memory space allocated for hybrid stage use in the target memory region.

It is worth noting that memory requirements of hybrid stage are significantly higher than those of pure backward propagation stage or parameter update stage, this is because the system needs to simultaneously maintain all intermediate data needed for both backward propagation computation and parameter update computation. Although this design increases immediate memory requirements, it may reduce resource consumption of data transfer between different train processing stages, improving training efficiency.

Figure 4:
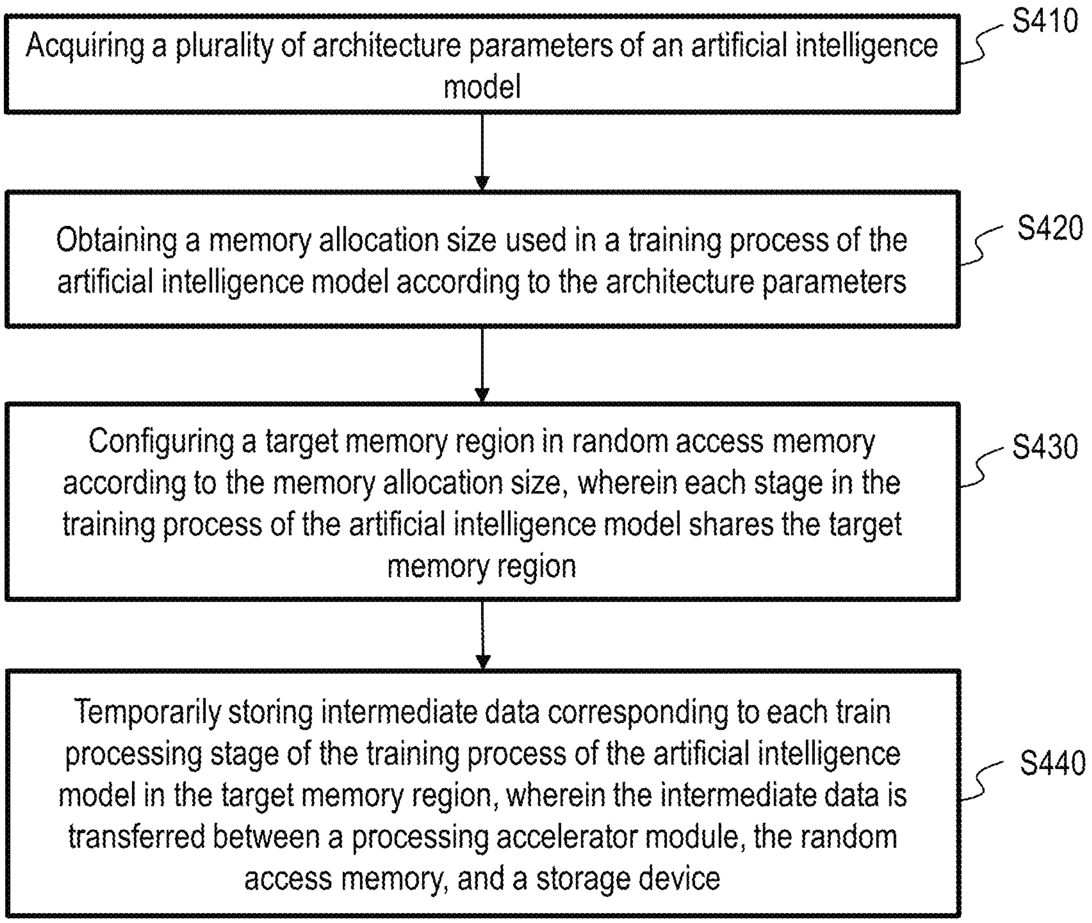
FIG. 4 is a flowchart of a memory management method according to an exemplary embodiment of the present invention.

FIG. 4 is a flowchart of a memory management method according to an exemplary embodiment of the present invention.

Referring to FIG. 4, in step S410, processor 110 obtains a plurality of architecture parameters of an artificial intelligence model.

Then, in step S420, processor 110 obtains a memory allocation size used in the training process of the artificial intelligence model according to the plurality of architecture parameters. Specifically, the processor calculates the first memory usage amount of backward propagation stage, the second memory usage amount of parameter update stage, or the third memory usage amount of hybrid stage according to the training strategy of the artificial intelligence model, and uses it as the memory allocation size. For example, for a model with 180 billion parameters, traditional training methods may require 1 TB to 2 TB of DRAM resources, while after adopting the memory management method of the present invention, only 64 GB or 128 GB of DRAM resources are needed to complete training.

Then, in step S430, processor 110 configures a target memory region in random access memory according to the memory allocation size, wherein multiple train processing stages in the training process of the artificial intelligence model share the target memory region. Through letting different train processing stages share the same memory space, memory usage may be effectively reduced and memory fragmentation may be avoided. This design is suitable for training environments with limited memory resources, for example AI computers using a single processing accelerator (such as NVIDIA RTX 4070Ti SUPER).

Finally, in step S440, processor 110 temporarily stores intermediate data corresponding to each train processing stage of the training process of the artificial intelligence model in the target memory region, wherein the intermediate data is transferred between the processing accelerator module, the random access memory and the storage device. For example, when the processing accelerator module needs to write intermediate data to the storage device, the intermediate data will first be written to the target memory region, then written from the target memory region to the storage device; when the processing accelerator module needs to read intermediate data from the storage device, the intermediate data will first be read from the storage device to the target memory region, then provided to the processing accelerator module from the target memory region. Through this design, even on systems using random access memory with smaller capacity, large AI model training may still be effectively supported, such as training requirements for Llama-3.1-8B or Llama-2-13B models.

However, each step in FIG. 4 has been explained in detail as above, so they will not be repeated here. It is worth noting that each step in FIG. 4 may be implemented as multiple program codes or circuits, the present invention is not limited to this. Furthermore, the method of FIG. 4 may be used in combination with the above exemplary embodiments, or used independently, the present invention is not limited to this.

In an embodiment, the processor of artificial intelligence processing system 10 manages memory through executing middleware. The middleware is a layer connecting the storage device hardware and software layers of the artificial intelligence processing system, with main functions including: extracting and analyzing architecture information of the artificial intelligence model, including number of model layers, parameter amounts, computation requirements, etc.; automatically calculating optimized memory allocation schemes according to analysis results; coordinating data transfer between the processing accelerator, the random access memory and the storage device; providing standardized programming interfaces for upper layer applications; dynamically managing system resource allocation and release, avoiding resource waste and memory fragmentation.

Specifically, the middleware first extracts the plurality of architecture parameters from the artificial intelligence model, including: model architecture information (such as parameter amount and input data dimension of each model layer), continuous computation segment width, batch size, input data specification, number of computation units, and parameter precision configuration, etc. For example, when users choose to train Llama-2-13B model, the middleware will automatically analyze the structure of that model to obtain required architecture parameters.

Then, the middleware executes memory allocation size computation according to the plurality of architecture parameters. For example, if users adopt mixed precision AdamW optimization algorithm for training, the middleware will calculate memory space needed for simultaneously processing weight parameters, gradient parameters, momentum parameters and variance parameters in hybrid stage.

Next, the middleware executes configuration of target memory region in the random access memory. For example, when the system is equipped with 64 GB DDR5 memory, the middleware will configure target memory region of appropriate size according to calculation results, making this region sharable by different train processing stages. It is worth mentioning that in another embodiment, target memory region may also be configured in High Bandwidth Memory. Specifically, in an embodiment, the target memory region may be configured in High Bandwidth Memory (HBM) of the processing accelerator module 140. High Bandwidth Memory has higher data access bandwidth. In this case, the target memory region may be configured in a specific section of this High Bandwidth Memory, allowing artificial intelligence model MA executing in processing accelerator module 140 to access intermediate data TD more quickly during training process.

In an embodiment, to improve data access efficiency, target memory region may be configured simultaneously in host memory 120 and High Bandwidth Memory of processing accelerator module 140. This is because during training process of artificial intelligence model, data needs to be frequently transferred between processing accelerator module 140 and host memory 120. Through configuring target memory region of the same size in High Bandwidth Memory of processing accelerator module 140, a corresponding memory space may be established for temporarily storing intermediate data TD during training process. This design may reduce data transfer latency and improve training efficiency.

Finally, the middleware is responsible for managing transfer of intermediate data among the processing accelerator module, the random access memory and the storage device. When the artificial intelligence model needs to access intermediate data during training process, the middleware will coordinate data read and write operations. For example, when needing to access gradient parameters stored in the storage device during parameter update stage, the middleware will manage data transfer paths to ensure data can flow effectively between different devices.

Through these functions of the middleware, artificial intelligence processing system 10 may automate memory management process, reducing configuration burden on users while improving memory usage efficiency of artificial intelligence processing system 10.

In an embodiment, the computer program product of the present invention includes middleware for executing memory management through processor 110 of artificial intelligence processing system 10. When users install and execute the computer program product on the artificial intelligence processing system 10, the middleware will be loaded and executed by the processor of artificial intelligence processing system 10. Middleware may be stored in storage media or internet, may be read and executed to implement the memory management method of the present invention. Through this design, the computer program product may reduce temporary memory resources needed for implementing artificial intelligence computation, enabling effective support for large AI model training requirements even in resource-constrained training environments.

Based on above, the memory management method, artificial intelligence processing system and computer program product provided by exemplary embodiments of the present invention may automatically calculate optimized memory allocation size according to a plurality of architecture parameters of artificial intelligence model, including model architecture, continuous computation segment width, batch size, input data specification, number of computation units and parameter precision configuration information. Through configuring target memory region in random access memory and letting each train processing stage in training process of artificial intelligence model share the target memory region, memory usage may be effectively reduced. Furthermore, through temporarily storing intermediate data corresponding to each train processing stage of the training process of the artificial intelligence model in the target memory region, and transferring data between the processing accelerator module, the random access memory and the storage device, memory fragmentation issues caused by traditional repeated allocation and release of memory space may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory management method, adapted for an artificial intelligence processing system having a processor, a processing accelerator module, a random access memory and a storage device, wherein the memory management method comprises:

obtaining a plurality of architecture parameters of an artificial intelligence model;

obtaining a memory allocation size used in a training process of the artificial intelligence model according to the architecture parameters;

configuring a target memory region in the random access memory according to the memory allocation size, wherein a plurality of train processing stages in the training process of the artificial intelligence model share the target memory region, wherein in each train processing stage, corresponding data processing operations are executed on each model layer in the artificial intelligence model according to a processing order of the train processing stage; and temporarily storing intermediate data corresponding to each train processing stage of the training process of the artificial intelligence model in the target memory region, wherein the intermediate data is transferred between the processing accelerator module, the random access memory, and the storage device, wherein obtaining the memory allocation size comprises obtaining respective memory usage amounts for each of the plurality of train processing stages, and determining the memory allocation size according to the respective memory usage amounts.

2. He memory management method as claimed in claim 1, the method further comprising:

obtaining data from the artificial intelligence model executed by the processing accelerator module, and writing the data to the target memory region as the intermediate data; and writing the intermediate data from the target memory region to the storage device.

3. The memory management method as claimed in claim 1, wherein the plurality of train processing stages comprise a backward propagation stage and a parameter update stage, wherein obtaining the memory allocation size used in the training process of the artificial intelligence model comprises:

obtaining a first memory usage amount of the backward propagation stage of the training process of the artificial intelligence model;

obtaining a second memory usage amount of the parameter update stage of the training process of the artificial intelligence model; and determining the memory allocation size according to the first memory usage amount and the second memory usage amount.

4. He memory management method as claimed in claim 3, wherein determining the memory allocation size according to the first memory usage amount and the second memory usage amount comprises:

selecting a larger one of the first memory usage amount and the second memory usage amount as the memory allocation size of the training process of the artificial intelligence model.

5. He memory management method as claimed in claim 3, wherein the target memory region comprises a first memory usage space configured for the backward propagation stage and a second memory usage space configured for the parameter update stage, wherein the first memory usage space and the second memory usage space at least partially overlap.

6. He memory management method as claimed in claim 3, wherein the architecture parameters comprise:

model architecture information, comprising a parameter amount and an input data dimension of each model layer of M model layers of the artificial intelligence model;

continuous computation segment width, used for setting a total number of model layers being simultaneously executed;

batch size, indicating a data processing amount of the training process;

input data specification, comprising an image size or a text sequence length;

number of computation units, indicating a total number of target accelerators in the processing accelerator module used for executing the artificial intelligence model; and parameter precision configuration, which defines precision types and byte numbers of weight parameters, gradient parameters and optimization parameters.

7. The memory management method as claimed in claim 6, wherein obtaining the first memory usage amount of the backward propagation stage of the training process of the artificial intelligence model comprises:

calculating a first parameter memory requirement amount of each model layer according to a first parameter amount of each model layer of the M model layers in the backward propagation stage, a first byte number defined by the parameter precision configuration and the number of computation units;

calculating an activation value memory requirement amount of each model layer according to the batch size, the input data specification, the input data dimension and an activation value byte number defined by the parameter precision configuration;

calculating a first model layer data amount corresponding to each model layer according to the first parameter memory requirement amount and the activation value memory requirement amount;

obtaining a plurality of first continuous computation segment data amounts according to the continuous computation segment width and the first model layer data amount corresponding to each model layer, wherein an i-th first continuous computation segment data amount is a sum of the first model layer data amounts from an i-th model layer to a j-th model layer, wherein the index i ranges from 1 to a difference between a total number of model layers M and a value that is one less than the continuous computation segment width N, and the index j is defined as a sum of the index i and the value that is one less than the continuous computation segment width N; and setting a maximum value among the plurality of first continuous computation segment data amounts as the first memory usage amount.

8. The memory management method as claimed in claim 7, wherein obtaining the second memory usage amount of the parameter update stage of the training process of the artificial intelligence model comprises:

calculating a second parameter memory requirement amount of each model layer according to a second parameter amount of each model layer of the M model layers in the parameter update stage, a second byte number defined by the parameter precision configuration and the number of computation units;

obtaining a second model layer data amount corresponding to each model layer according to the second parameter memory requirement amount;

obtaining a plurality of second continuous computation segment data amounts according to the continuous computation segment width and the second model layer data amount corresponding to each model layer, wherein an i-th second continuous computation segment data amount is a sum of the second model layer data amounts from an i-th model layer to a j-th model layer, wherein the index i ranges from 1 to a difference between a total number of model layers M and a value that is one less than the continuous computation segment width N, and the index i is defined as a sum of the index i and the value that is one less than the continuous computation segment width N; and setting a maximum value among the plurality of second continuous computation segment data amounts as the second memory usage amount.

9. The memory management method as claimed in claim 8, further comprising:

determining whether the training process of the artificial intelligence uses a hybrid stage corresponding to the backward propagation stage and the parameter update stage; and in response to determining using the hybrid stage:

obtaining a plurality of hybrid continuous computation segment data amounts according to the continuous computation segment width and the first model layer data amount and the second model layer data amount corresponding to each model layer, wherein an i-th hybrid continuous computation segment data amount is a sum of the first model layer data amount and the second model layer data amount from an i-th model layer to a j-th model layer, wherein the index i ranges from 1 to a difference between a total number of model layers M and a value that is one less than the continuous computation segment width N, and the index i is defined as a sum of the index i and the value that is one less than the continuous computation segment width N; and setting a maximum value among the plurality of hybrid continuous computation segment data amounts as a third memory usage amount of the hybrid stage, and using the third memory usage amount as the memory allocation size of the training process of the artificial intelligence model.

10. He memory management method as claimed in claim 1, further comprising:

executing middleware, wherein the middleware is used for:

obtaining the architecture parameters of the artificial intelligence model;

executing computation of the memory allocation size;

executing configuration of the target memory region; and managing transfer of the intermediate data among the processing accelerator module, the random access memory and the storage device.

11. He memory management method as claimed in claim 10, wherein the method further comprises:

providing target memory region information to a framework layer by the middleware, wherein the target memory region information comprises:

a start address of the target memory region;

a size of the target memory region; and an access permission of the target memory region;

wherein the framework layer is an artificial intelligence computing development framework, wherein the processor executes the framework layer to provide a program development interface to the artificial intelligence model.

12. He memory management method as claimed in claim 10, wherein the target memory region may further be configured in a High Bandwidth Memory (HBM) of the processing accelerator module.

13. He memory management method as claimed in claim 3, wherein the backward propagation stage comprises:

comparing an output result of the artificial intelligence model with a corresponding target result in a predefined dataset to calculate an error value based on the predefined dataset; and executing gradient computation on parameters of each model layer in the artificial intelligence model using a backward propagation algorithm according to the error value to obtain gradient values corresponding to the parameters.

14. He memory management method as claimed in claim 3, wherein the parameter update stage comprises:

calculating a parameter update direction of the artificial intelligence model according to a preset optimization algorithm and the gradient values calculated in the backward propagation stage; and adjusting parameter values in the artificial intelligence model according to the parameter update direction.

15. An artificial intelligence processing system, comprising:

a processor;

a processing accelerator module, used for executing an artificial intelligence model;

a random access memory;

a storage device, wherein the processor is electrically connected to the processing accelerator module, the random access memory and the storage device, wherein the processor is configured by executing middleware to:

obtain a plurality of architecture parameters of the artificial intelligence model;

obtain a memory allocation size used in a training process of the artificial intelligence model according to the architecture parameters;

configure a target memory region in the random access memory according to the memory allocation size, wherein a plurality of train processing stages in the training process of the artificial intelligence model share the target memory region, wherein in each train processing stage, corresponding data processing operations are executed on each model layer in the artificial intelligence model according to a processing order of the train processing stage; and temporarily store intermediate data corresponding to each train processing stage of the training process of the artificial intelligence model in the target memory region, wherein the intermediate data is transferred between the processing accelerator module, the random access memory, and the storage device, wherein obtaining the memory allocation size comprises obtaining respective memory usage amounts for each of the plurality of train processing stages, and determining the memory allocation size according to the respective memory usage amounts.

16. He artificial intelligence processing system as claimed in claim 15, wherein the processor is further configured to:

obtain data from the artificial intelligence model, and write the data to the target memory region as the intermediate data; and write the intermediate data from the target memory region to the storage device.

17. He artificial intelligence processing system as claimed in claim 15, wherein the plurality of train processing stages comprise a backward propagation stage and a parameter update stage, wherein obtaining the memory allocation size used in the training process of the artificial intelligence model comprises:

the processor obtaining a first memory usage amount of the backward propagation stage of the training process of the artificial intelligence model;

the processor obtaining a second memory usage amount of the parameter update stage of the training process of the artificial intelligence model; and the processor determining the memory allocation size according to the first memory usage amount and the second memory usage amount.

18. He artificial intelligence processing system as claimed in claim 17, wherein determining the memory allocation size according to the first memory usage amount and the second memory usage amount comprises:

the processor selecting a larger one of the first memory usage amount and the second memory usage amount as the memory allocation size of the training process of the artificial intelligence model.

19. He artificial intelligence processing system as claimed in claim 17, wherein the target memory region comprises a first memory usage space configured for the backward propagation stage and a second memory usage space configured for the parameter update stage, wherein the first memory usage space and the second memory usage space at least partially overlap.

20. He artificial intelligence processing system as claimed in claim 17, wherein the architecture parameters comprise:

model architecture information, comprising a parameter amount and an input data dimension of each model layer of M model layers of the artificial intelligence model;

continuous computation segment width, used for setting a total number of model layers being simultaneously executed;

batch size, indicating a data processing amount of the training process;

input data specification, comprising an image size or a text sequence length;

number of computation units, indicating a total number of target accelerators in the processing accelerator module used for executing the artificial intelligence model; and parameter precision configuration, which defines precision types and byte numbers of weight parameters, gradient parameters and optimization parameters.

21. The artificial intelligence processing system as claimed in claim 20, wherein obtaining the first memory usage amount of the backward propagation stage of the training process of the artificial intelligence model comprises:

the processor calculating a first parameter memory requirement amount of each model layer according to a first parameter amount of each model layer of the M model layers in the backward propagation stage, a first byte number defined by the parameter precision configuration and the number of computation units;

the processor calculating an activation value memory requirement amount of each model layer according to the batch size, the input data specification, the input data dimension and an activation value byte number defined by the parameter precision configuration;

the processor calculating a first model layer data amount corresponding to each model layer according to the first parameter memory requirement amount and the activation value memory requirement amount;

the processor obtaining a plurality of first continuous computation segment data amounts according to the continuous computation segment width and the first model layer data amount corresponding to each model layer, wherein an i-th first continuous computation segment data amount is a sum of the first model layer data amounts from an i-th model layer to a j-th model layer, wherein the index i ranges from 1 to a difference between a total number of model layers M and a value that is one less than the continuous computation segment width N, and the index j is defined as a sum of the index i and the value that is one less than the continuous computation segment width N; and the processor setting a maximum value among the plurality of first continuous computation segment data amounts as the first memory usage amount.

22. The artificial intelligence processing system as claimed in claim 21, wherein obtaining the second memory usage amount of the parameter update stage of the training process of the artificial intelligence model comprises:

the processor calculating a second parameter memory requirement amount of each model layer according to a second parameter amount of each model layer of the M model layers in the parameter update stage, a second byte number defined by the parameter precision configuration and the number of computation units;

the processor obtaining a second model layer data amount corresponding to each model layer according to the second parameter memory requirement amount;

the processor obtaining a plurality of second continuous computation segment data amounts according to the continuous computation segment width and the second model layer data amount corresponding to each model layer, wherein an i-th second continuous computation segment data amount is a sum of the second model layer data amounts from an i-th model layer to a j-th model layer, wherein the index i ranges from 1 to a difference between a total number of model layers M and a value that is one less than the continuous computation segment width N, and the index i is defined as a sum of the index i and the value that is one less than the continuous computation segment width N; and the processor setting a maximum value among the plurality of second continuous computation segment data amounts as the second memory usage amount.

23. The artificial intelligence processing system as claimed in claim 22, wherein the processor is further configured to:

determine whether the training process of the artificial intelligence uses a hybrid stage corresponding to the backward propagation stage and the parameter update stage; and in response to determining using the hybrid stage:

obtain a plurality of hybrid continuous computation segment data amounts according to the continuous computation segment width and the first model layer data amount and the second model layer data amount corresponding to each model layer, wherein an i-th hybrid continuous computation segment data amount is a sum of the first model layer data amount and the second model layer data amount from an i-th model layer to a j-th model layer, wherein the index i ranges from 1 to a difference between a total number of model layers M and a value that is one less than the continuous computation segment width N, and the index j is defined as a sum of the index i and the value that is one less than the continuous computation segment width N; and set a maximum value among the plurality of hybrid continuous computation segment data amounts as a third memory usage amount of the hybrid stage, and use the third memory usage amount as the memory allocation size of the training process of the artificial intelligence model.

24. He artificial intelligence processing system as claimed in claim 15, wherein the middleware is used for:

obtaining the architecture parameters of the artificial intelligence model;

executing computation of the memory allocation size;

executing configuration of the target memory region; and managing transfer of the intermediate data among the processing accelerator module, the random access memory and the storage device.

25. He artificial intelligence processing system as claimed in claim 24, wherein the method further comprises:

providing target memory region information to a framework layer by the middleware, wherein the target memory region information comprises:

a start address of the target memory region;

a size of the target memory region; and an access permission of the target memory region;

wherein the framework layer is an artificial intelligence computing development framework, wherein the processor executes the framework layer to provide a program development interface to the artificial intelligence model.

26. He artificial intelligence processing system as claimed in claim 24, wherein the target memory region may further be configured in a High Bandwidth Memory (HBM) of the processing accelerator module.

27. He artificial intelligence processing system as claimed in claim 17, wherein the backward propagation stage comprises:

comparing an output result of the artificial intelligence model with a corresponding target result in a predefined dataset to calculate an error value based on the predefined dataset; and executing gradient computation on parameters of each model layer in the artificial intelligence model using a backward propagation algorithm according to the error value to obtain gradient values corresponding to the parameters.

28. He artificial intelligence processing system as claimed in claim 17, wherein the parameter update stage comprises:

calculating a parameter update direction of the artificial intelligence model according to a preset optimization algorithm and the gradient values calculated in the backward propagation stage; and adjusting parameter values in the artificial intelligence model according to the parameter update direction.

29. A computer program product, comprising a non-transitory computer readable medium storing middleware, wherein the middleware is executed by a processor of an artificial intelligence processing system to:

obtain a plurality of architecture parameters of an artificial intelligence model, wherein the artificial intelligence model is executed by a processing accelerator module of the artificial intelligence processing system;

obtain a memory allocation size used in a training process of the artificial intelligence model according to the architecture parameters;

configure a target memory region in a random access memory of the artificial intelligence processing system according to the memory allocation size, wherein a plurality of train processing stages in the training process of the artificial intelligence model share the target memory region; and temporarily store intermediate data corresponding to each train processing stage of the training process of the artificial intelligence model in the target memory region, wherein the intermediate data is transferred between the processing accelerator module of the artificial intelligence processing system, the random access memory, and a storage device, wherein obtaining the memory allocation size comprises obtaining respective memory usage amounts for each of the plurality of train processing stages, and determining the memory allocation size according to the respective memory usage amounts.

* * * * *